(12) United States Patent
Liu et al.

(10) Patent No.: US 11,800,595 B2
(45) Date of Patent: Oct. 24, 2023

(54) DISCONTINUOUS RECEPTION (DRX) EXTENDED-ON AND DYNAMIC TRANSMISSION PATTERNS IN SIDELINK

(71) Applicant: QUALCOMM INCORPORATED, San Diego, CA (US)

(72) Inventors: Chih-Hao Liu, San Diego, CA (US); Xiaoxia Zhang, San Diego, CA (US); Jing Sun, San Diego, CA (US); Yisheng Xue, San Diego, CA (US); Ozcan Ozturk, San Diego, CA (US); Sony Akkarakaran, Poway, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/243,498

(22) Filed: Apr. 28, 2021

(65) Prior Publication Data
US 2022/0353945 A1 Nov. 3, 2022

(51) Int. Cl.
*H04W 76/28* (2018.01)
*H04L 1/1812* (2023.01)
*H04W 92/00* (2009.01)

(52) U.S. Cl.
CPC ........... *H04W 76/28* (2018.02); *H04L 1/1812* (2013.01); *H04W 92/00* (2013.01)

(58) Field of Classification Search
CPC ..... H04W 76/28; H04W 92/18; H04W 76/14; H04L 1/1812; H04L 2001/0092; H04L 1/1854
See application file for complete search history.

(56) References Cited

U.S. PATENT DOCUMENTS

| | | | | |
|---|---|---|---|---|
| 2021/0410126 A1* | 12/2021 | Ganesan | ............... | H04L 1/1854 |
| 2022/0022279 A1* | 1/2022 | Kim | ...................... | H04W 72/23 |
| 2022/0191794 A1* | 6/2022 | Pan | ...................... | H04W 28/24 |
| 2022/0217740 A1* | 7/2022 | Park | ...................... | H04L 1/1848 |
| 2022/0322486 A1* | 10/2022 | Park | ...................... | H04W 76/14 |
| 2022/0322487 A1* | 10/2022 | Sabouri-Sichani | ... | H04W 68/02 |
| 2023/0007726 A1* | 1/2023 | Chang | .................... | G08G 1/164 |
| 2023/0024646 A1* | 1/2023 | Park | ...................... | H04W 4/40 |

* cited by examiner

*Primary Examiner* — Abdullahi Ahmed
(74) *Attorney, Agent, or Firm* — Haynes and Boone LLP

(57) ABSTRACT

Wireless communications systems and methods related to discontinuous reception (DRX) extended-on operations and dynamic transmission patterns in sidelink are provided. A first user equipment (UE) determines a transmission pattern for a first sidelink based on an extended DRX on-duration associated with a second sidelink different from the first sidelink, wherein the first sidelink is between the first UE and a second UE, and wherein the second sidelink is between the second UE and a third UE. The first UE transmits, to the second UE over the first sidelink during the extended DRX on-duration based on the transmission pattern, a communication signal.

30 Claims, 16 Drawing Sheets

DISCONTINUOUS RECEPTION (DRX) EXTENDED-ON AND DYNAMIC TRANSMISSION PATTERNS IN SIDELINK

TECHNICAL FIELD

This application relates to wireless communication systems, and more particularly to discontinuous reception (DRX) extended-on operations and dynamic transmission patterns in sidelink.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5$^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a first user equipment (UE). The method includes determining a transmission pattern for a first sidelink based on an extended discontinuous reception (DRX) on-duration associated with a second sidelink different from the first sidelink, where the first sidelink is between the first UE and a second UE, and where the second sidelink is between the second UE and a third UE; and transmitting, to the second UE over the first sidelink during the extended DRX on-duration based on the transmission pattern, a communication signal.

In an additional aspect of the disclosure, a method of wireless communication performed by a first user equipment (UE). The method includes receiving, from a second UE over a first sidelink, a first communication signal; and receiving, from a third UE over a second sidelink during an extended DRX on-duration associated with the first sidelink, a second communication signal, where the second sidelink is different from the first sidelink, and where the extended DRX on-duration is based on the first communication signal.

In an additional aspect of the disclosure, a first user equipment (UE) includes a memory; a transceiver; and at least one processor coupled to the memory and the transceiver, where the at least one processor is configured to determine a transmission pattern for a first sidelink based on an extended discontinuous reception (DRX) on-duration associated with a second sidelink different from the first sidelink, where the first sidelink is between the first UE and a second UE, and where the second sidelink is between the second UE and a third UE; and transmit, via the transceiver to the second UE over first sidelink during the extended DRX on-duration based on the transmission pattern, a communication signal.

In an additional aspect of the disclosure, a first user equipment (UE) includes a memory; a transceiver; and at least one processor coupled to the memory and the transceiver, where the at least one processor is configured to receive, via the transceiver from a second UE over first sidelink, a first communication signal; and receive, via the transceiver from a third UE over a second sidelink during an extended DRX on-duration associated with the first sidelink, a second communication signal, where the second sidelink is different from the first sidelink, and where the extended DRX on-duration is based on the first communication signal.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
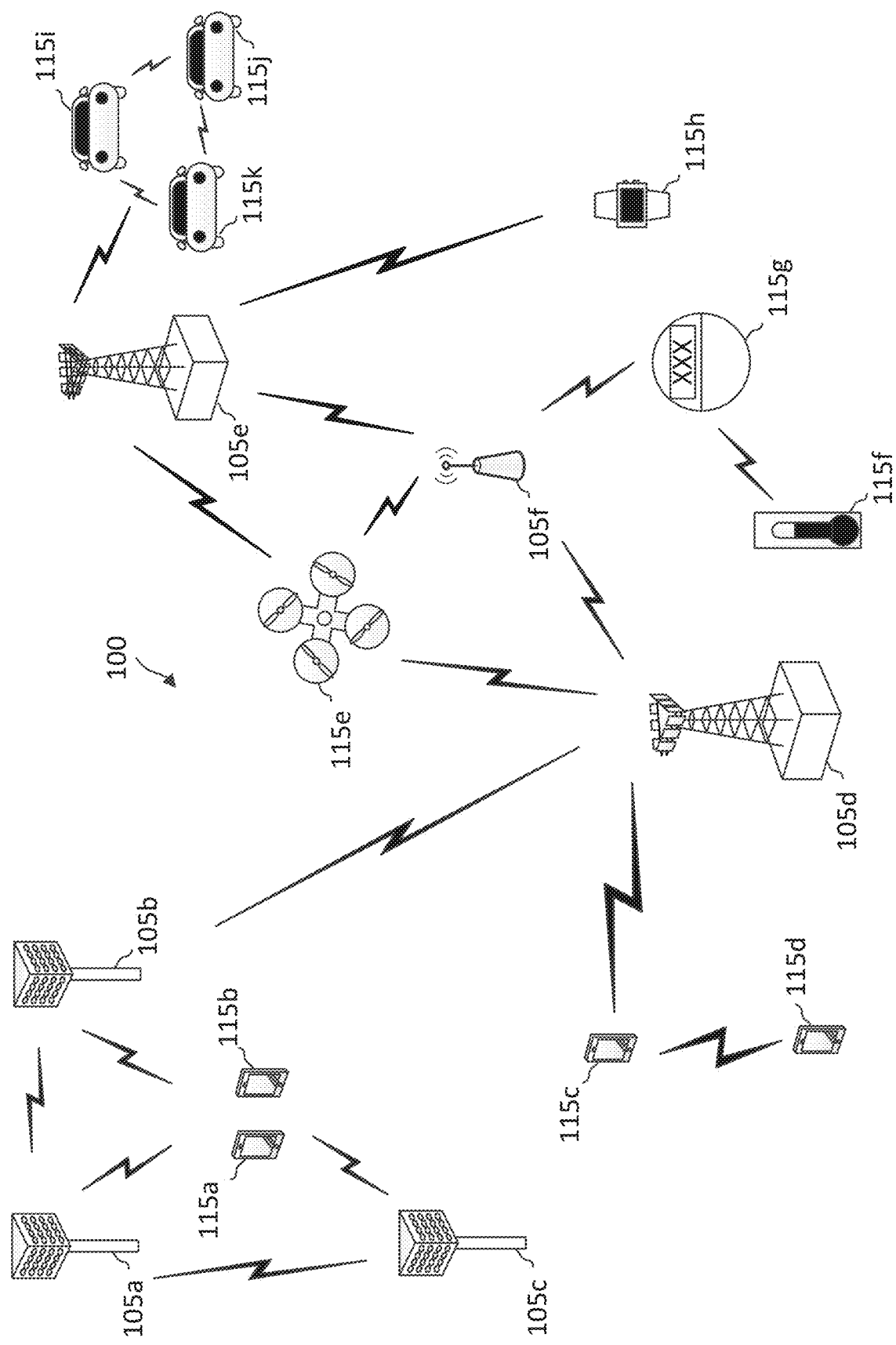
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (1-R2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some implementations, the SCI in the PSCCH may referred to as SCI part 1 (SCI-1), and additional SCI, which may be referred to as SCI part 2 (SCI-2) may be carried in the PSSCH. The SCI-2 can include control information (e.g., transmission parameters, modulation coding scheme (MCS)) that are more specific to the data carrier in the PSSCH. Use cases for sidelink communication may include V2X, enhanced mobile broadband (eMBB), industrial IoT (IIoT), and/or NR-lite.

As used herein, the term "sidelink UE" may refer to a user equipment device performing a device-to-device communication or other types of communications with another user equipment device independent of any tunneling through the BS (e.g., gNB) and/or an associated core network. As used herein, the term "sidelink transmitting UE" may refer to a user equipment device performing a sidelink transmission operation. As used herein, the term "sidelink receiving UE" may refer to a user equipment device performing a sidelink reception operation. A sidelink UE may operate as a transmitting sidelink UE at one time and operate as a receiving sidelink UE at another time.

Due to the power demands on wireless communication devices associated with voice, video, packet data, messaging, broadcast, and other communications and limited power resources at the wireless communication devices, there is a desire to limit usage of device components and save power when possible, for example, using discontinuous reception (DRX). DRX is a technique in which a UE may be in DRX inactive time or DRX active time during a DRX cycle. That is, a DRX cycle can include a DRX active time period, which may be referred to as a DRX on-duration, followed by a DRX inactive time period, which may be may be referred to as a DRX off-duration. The DRX inactive time allows the UE to power down certain radio components or at least switch certain radio components to a lower power state than when in an active state. Accordingly, the use of DRX can provide power savings at the UE.

In sidelink, a pair of sidelink transmitting and receiving UEs may establish a connection (e.g., a unicast connection) with each other and may apply DRX and/or discontinuous transmission (DTX) for communications to save power at the sidelink transmitting UE and/or at the sidelink receiving UE. DRX in sidelink can be transmitter-centric, receiver-centric, or cooperation between a transmitter-receiver pair. For transmitter-centric DRX, each sidelink transmitting UE may determine a preferred transmission pattern and provide a peer or corresponding sidelink receiving UE with the transmission pattern. The transmission pattern may also be referred to as a DTX pattern, which may include transmission on-durations interleaving with transmission off-durations. During a transmission on-duration, the sidelink transmitting UE may be in an active state (e.g., awake) and may transmit to a peer sidelink receiving UE. During a transmission-off duration, the sidelink transmitting UE may be in an inactive state (e.g., a sleep state or low-power state) where no transmission may be transmitted to a peer sidelink receiving UE. Accordingly, a sidelink receiving UE may configure itself to be awake during each transmission on-duration of each peer sidelink transmitting UE so that the sidelink receiving UE may monitor for transmissions from its peer sidelink transmitting UEs during corresponding transmission on-durations. For receiver-centric DRX, each sidelink receiving UE may determine a preferred reception pattern and provide a peer or corresponding sidelink transmitting UE with the preferred reception pattern. The reception pattern may also be referred to as a DRX pattern, which may include DRX on-durations interleaving with DRX off-durations. During a DRX on-duration, the sidelink receiving UE may be in an active state (e.g., awake) and may monitor for transmission from a peer sidelink transmitting UE. During a DRX off-duration, the sidelink receiving UE may be in an inactive state (e.g., sleep state or a low-power state) where the sidelink receiving UE may not monitor for transmission from as a peer sidelink receiving UE. Accordingly, a sidelink transmitting UE may transmit to a peer sidelink receiving UE within DRX on-durations of the peer sidelink receiving UE. For transmit-receiver cooperative DRX, a sidelink transmitting UE and a peer sidelink receiving UE may exchange and/or negotiate a DRX pattern and communicate with each other during the DRX on-duration(s) of the DRX pattern.

For regular DRX, a sidelink receiving UE may operate in an active state during a DRX-on duration, and may switch to operate in an inactive state at the end of the DRX-duration and may remain in the inactive state until the next DRX-on duration (in a next DRX cycle). However, in some instances, the sidelink receiving UE may continue to operate in the active state beyond the end of a DRX on-duration, for example, based on one or more active timers. That is, the sidelink receiving UE may extend a DRX on-duration for a duration of time based on certain timers. The on-duration that is extended from the DRX on-duration as configured by a DRX cycle may be referred to as an extended DRX on-duration.

In some aspects, a sidelink receiving UE may utilize a set of timers for DRX operations, and may maintain the active state while at least one timer of the set of timers is in progress or active. Each timer may correspond to a specific activation trigger, a specific deactivation trigger, and a specific active duration. For example, the sidelink receiving UE may start or restart a DRX-inactivity timer upon receiving SCI destined to the sidelink receiving UE and may remain in an active state while the DRX-inactivity timer is in progress irrespective of whether a current time is outside of a DRX on-duration. In another example, the sidelink receiving UE may start a DRX-retransmission timer upon transmitting a hybrid automatic repeat request (HARQ) acknowledgement/negative-acknowledgement (ACK/NACK) and may remain in an active state while the DRX-retransmission timer is in progress irrespective of whether a current time is outside of a DRX on-duration. In some implementations, the UE may support other timers that may not maintain the active state, but may trigger activation of other timers or operations, such as a DRX-hybrid automatic repeat request (HARQ) round-trip-time (RTT) timer. If no timer maintaining the active state is currently running at the sidelink receiving UE, the sidelink receiving UE may operate in a sleep mode. The sidelink receiving UE may not monitor for sidelink transmission while in the sleep mode.

In certain aspects, a sidelink receiving UE may communicate with multiple peer sidelink transmitting UEs. For instance, the sidelink receiving UE may be connected to a first sidelink transmitting UE via a first sidelink and connected to a second sidelink transmitting UE over a second sidelink. The sidelink receiving UE may utilize a first DRX pattern for communication with the first sidelink transmitting UE over the first sidelink, and may utilize a second DRX pattern for communication with the second sidelink transmitting UE over the second sidelink. In order to receive sidelink transmissions from the first sidelink transmitting UE and/or the second sidelink transmitting UE, the sidelink receiving UE may stay in an active state or awake during DRX on-durations of the first DRX pattern and during DRX on-durations of the second DRX pattern. In some aspects, the first and second DRX patterns may be different, and thus DRX on-durations of the first DRX pattern and the DRX on-durations of the second DRX pattern may be offset from each other. In some instances, a first DRX on-duration of the first DRX pattern may at least partially overlaps with a second DRX on-duration of the second DRX pattern, resulting in a longer DRX on-duration (a union or superposition of the first DRX on-duration and the second DRX on-duration) at the sidelink receiving UE. Further, in some instances, the sidelink receiving UE may extend the second DRX on-duration for the second sidelink, for example, based on an active DRX-inactivity timer and/or an active DRX-retransmission timer. That is, the sidelink receiving UE may remain in an active state for an extended duration (e.g., an extended DRX on-duration) to monitor for transmissions over the second sidelink. In some instances, a least a portion of the extended DRX on-duration may be within a DRX off-duration for the first sidelink. In some scenarios, it may be desirable for the first sidelink transmitting UE to transmit to the sidelink receiving UE during the extended DRX on-duration instead of waiting until a next DRX on-duration for the first sidelink. In this way, communication latency over the first sidelink can be reduced. Since the sidelink receiving UE may remain in an active state during the extended DRX on-duration irrespective of whether the first sidelink transmitting UE transmit to the sidelink receiving UE or not, the first sidelink transmitting UE may transmit to the sidelink receiving UE during the extended on-duration without increasing power consumption at the sidelink receiving UE.

The present disclosure provides mechanisms for sidelink DRX extended-on operations and dynamic transmission pattern adjustments based on sensing and/or receiver's assistance. For example, a first UE may communicate with a second UE over a first sidelink according to a first DRX cycle, where the first UE may be a sidelink transmitting UE and the second UE may be a sidelink receiving UE over the first sidelink. The second UE may further communicate with a third UE over a second sidelink according to a second DRX cycle, where the third UE may be a sidelink transmitting UE and the second UE may be a sidelink receiving UE over the second sidelink. The first UE may determine a transmission pattern for the first sidelink based on an extended DRX on-duration associated with the second sidelink. The extended DRX on-duration may be extended from an on-duration of the second DRX cycle associated with the second sidelink. The first UE may transmit a communication signal to the second UE over the first sidelink during the extended DRX on-duration based on the transmission pattern. For instance, the first UE may initially determine the transmission pattern for communicating with the second UE based on the first DRX cycle, where each transmission on-duration of the transmission pattern may be within a DRX on-duration of the first DRX cycle. Subsequently, the first UE may dynamically adjust the transmission pattern based on the extended DRX on-duration. For example, the first UE may add a transmission on-duration corresponding to the extended DRX on-duration (during which the second UE may be in an active state monitoring for transmission) into the transmission pattern. The first UE may schedule the communication signal to be transmitted to the second UE during a period within the added transmission on-duration (corresponding to the extended DRX on-duration). The period may be outside of a DRX on-duration of the first DRX cycle.

In some aspects, the first UE may monitor for SCI associated with the second sidelink, and may determine the extended DRX on-duration for the second sidelink in response to detecting the SCI from the monitoring. To that end, the first UE may have information that the second UE may start a DRX-inactivity timer upon receiving the SCI over the second sidelink, and the second UE may remain in an active state (for the extended DRX on-duration) while the DRX-inactivity timer is in progress or active. The second UE may start and/or configure a DRX-inactivity timer in various ways. The SCI may indicate reservation(s) for sidelink resource(s) in some upcoming sidelink slots. The second UE may configure the DRX-inactivity timer based on the sidelink reservations so that the second UE may remain in active state to receive transmissions in the reserved resources. In a first aspect, the second UE may start or restart a DRX-inactivity timer upon detecting the SCI and may configure the DRX-inactivity timer with a duration to include a next reserved sidelink resource (in time) reserved by the SCI. In a second aspect, the second UE may start a DRX-inactivity timer upon detecting the SCI and configure the DRX-inactivity timer with a duration to include the last resource (in time) reserved by the SCI and an additional X number of slots (e.g., a time offset) after the last reserved resource. In a third aspect, the second UE may start a DRX-inactivity timer upon detecting the SCI and configure the DRX-inactivity timer with a duration to include a PSFCH resource associated with the last resource (in time) reserved by the SCI and an additional Y number of slots (e.g., a time offset) after the PSFCH resource. In some aspects, the first UE may have information about a DRX-inactivity timer configuration utilized by the second UE, for example, whether the second UE may start and/or configure a DRX-inactivity timer according to the first aspect, the second aspect, or the third aspect discussed above. Accordingly, the first UE may determine the extended DRX on-duration based on the DRX-inactivity timer configuration. In some aspects, the second UE may transmit, and the first UE may receive the DRX-inactivity timer configuration.

Further, in some aspects, the first UE may monitor for a HARQ ACK/NACK indication for data associated with the SCI, and may determine the extended DRX on-duration for the second sidelink in response to detecting a NACK indication from the monitoring. To that end, the first UE may have information that the second UE may start a DRX-retransmission timer if the second UE fails to decode the data, and the second UE may remain in an active state (for the extended DRX on-duration) while the DRX-retransmission timer is in progress or active. Further, in some aspects, the first UE may have information that the second UE may start a DRX-HARQ-RTT timer after transmitting a NACK and may power down some device components while the DRX-HARQ-RTT timer is in progress. Accordingly, the first UE may exclude a period corresponding to the DRX-HARQ-RTT timer from a transmission on-duration. That is, the first UE may refrain from transmitting to the second UE during that period.

In some aspects, the second UE may transmit, and the first UE may receive, information associated with the extended DRX on-duration, and may determine the transmission pattern based on the received information. The extended DRX on-duration information may indicate a start time, a duration, and/or an end time of the extended DRX on-duration. In general, the first UE may dynamically adjust the transmission pattern based on SCI monitoring, NACK monitoring, and/or assistance information (e.g., extended DRX on-duration information) provided by the second UE.

In some aspects, to avoid having the second UE (a sidelink receiving UE) to continue to remain in an active state for a prolong period or an indefinite period, the second UE may limit an extended DRX on-duration to a threshold extended DRX on-duration. In other words, the second UE may remain in an active state after a DRX on-duration for a maximum duration corresponding to the threshold extended DRX on-duration. In other aspects, the second UE may not start a DRX-inactivity timer based on SCI received over a current sidelink when the SCI is received based on an extended DRX on-duration of another sidelink.

Aspects of the present disclosure can provide several benefits. For example, allowing a sidelink transmitting UE to transmit to a sidelink receiving UE over a first sidelink by utilizing an extended DRX on-duration extended for a second, different sidelink at the sidelink receiving UE can reduce communication latency over the first sidelink without impacting power consumption at the sidelink receiving UE. Adjusting a transmission pattern at the sidelink transmitting UE based on SCI and/or NACK monitoring allows the sidelink transmitting UE to transmit to the sidelink receiving UE with a lower latency without impacting processing at the sidelink receiving UE (e.g., transparent to the sidelink receiving UE). Providing assistance information (e.g., extended DRX on-duration information) to the sidelink transmitting UE rather than relying on SCI and/or NACK monitoring by the sidelink transmitting UE can reduce processing overhead at the sidelink transmitting UE and may increase the chances of the sidelink transmitting UE utilizing the extended DRX on-duration since SCI and/or NACK monitoring are opportunistic and may be dependent on when the sidelink transmitting UE monitors for SCI and/or NACK.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may provision for sidelink communications to allow a UE 115 to communicate with another UE 115 without tunneling through a BS 105 and/or the core network. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages. In a first-stage SCI (which may be referred to as SCI-1), the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI (which may be referred to as SCI-2), the UE 115 may transmit SCI in PSSCH carrying information for decoding the PSSCH. The second-stage SCI may include an 8-bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

Figure 2:
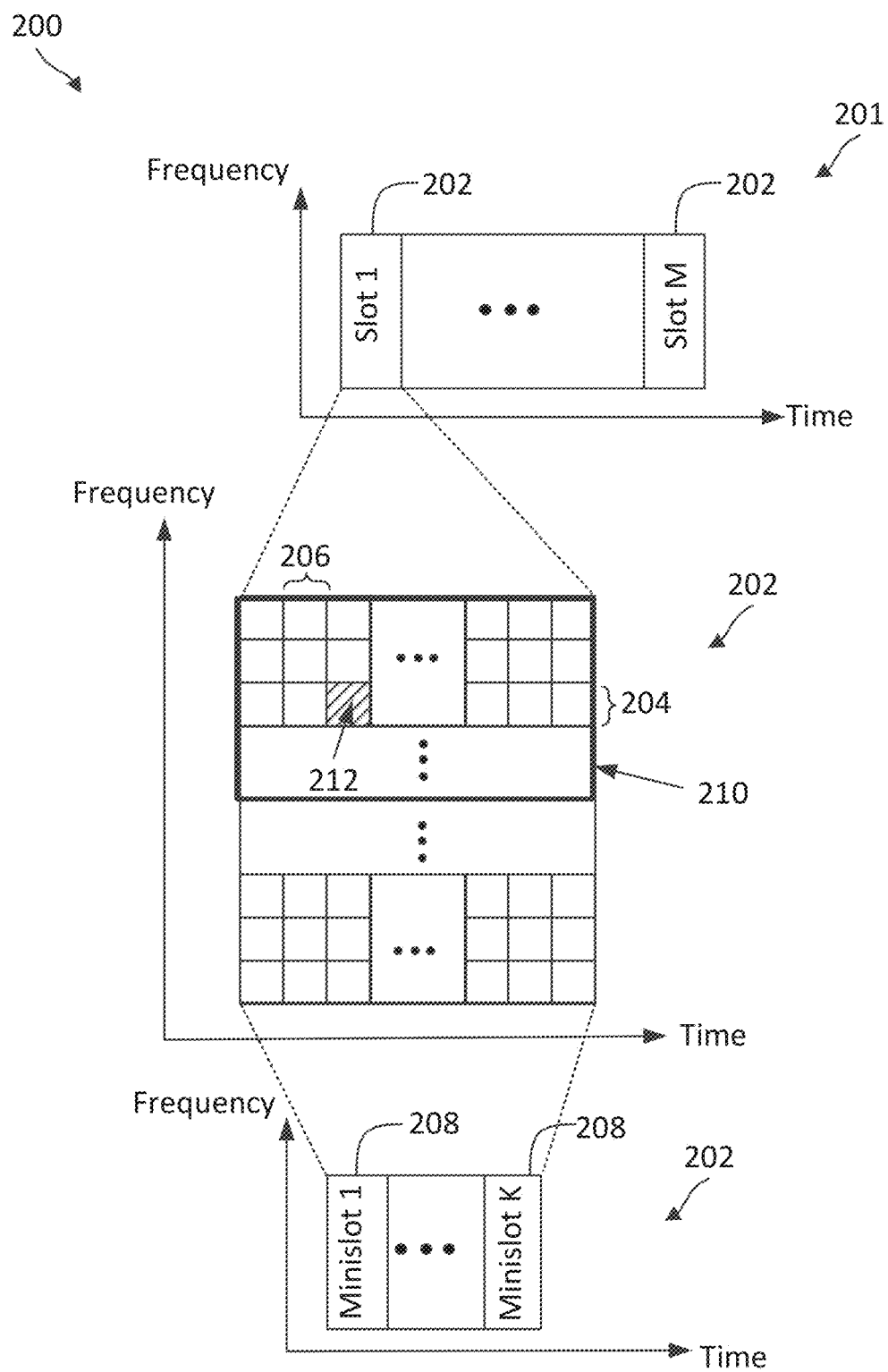
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, a UE may communicate with a BS (over a direct link or Uu interface) and/or with another UE (over a sidelink or PC5 interface) using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols). In some aspects, a UE (e.g., UE 115i of FIG. 1) may also communicate sidelink with another UE (e.g., UE 115j of FIG. 1) in units of time slots similar to the slot 202 as will be further described below in with respect to FIG. 3.

Figure 3:
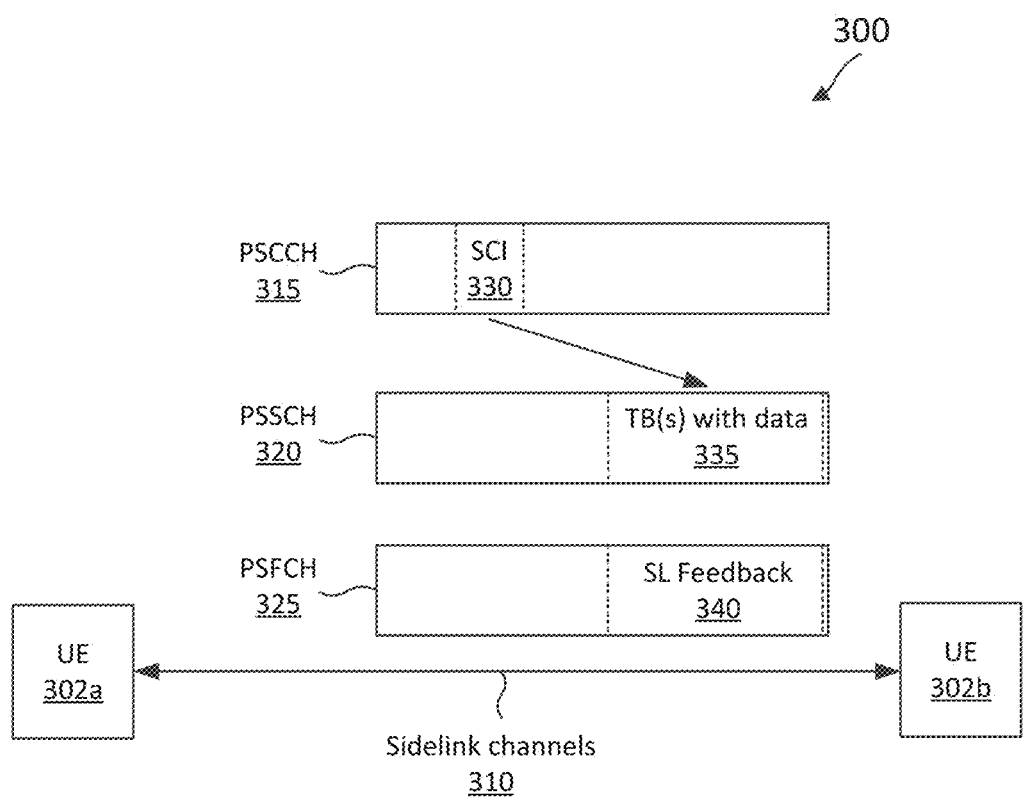
FIG. 3 illustrates a sidelink communication scheme according to some aspects of the present disclosure.

FIG. 3 illustrates a sidelink communication scheme 300 according to some aspects of the present disclosure. The scheme 300 may be employed by UEs such as the UEs 115 and 315 in a network such as the networks 100 and/or 300 for sidelink communications. As shown in FIG. 3, a first UE 302a may communicate with a second UE 302b (and one or more other UEs 302)) via one or more sidelink channels 310. The UEs 302 and 302b may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 302 (e.g., UE 302a and/or UE 302b) may correspond to one or more other UEs described elsewhere herein, such as UE 115 and/or 315. In some aspects, the one or more sidelink channels 310 may use a PC5 interface and/or may operate in a high frequency band (e.g., about 3 GHz, 5 GHz, 6 GHz, or mmWave band). Additionally, or alternatively, the UEs 302 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a PSCCH 315, a PSSCH 320, and/or a PSFCH 325. The PSCCH 315 may be used to communicate control information, similar to a PDCCH and/or a PUCCH used for cellular communications with a base station 110 via an access link or an access channel. The PSSCH 320 may be used to communicate data, similar to a PDSCH and/or a PUSCH used for cellular communications with a base station 110 via an access link or an access channel. In some aspects, the PSCCH 315 may carry SCI 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as HARQ feedback (e.g., ACK/NACK information), transmit power control (TPC), a scheduling request (SR), and/or the like.

In some aspects, the one or more sidelink channels 310 may use resources from a sidelink resource pool. A sidelink resource pool may refer to a set of time resources (including a number of symbols similar to the symbols 206 or a number of slots similar to the slots 202) and frequency resources (including a number of subcarriers similar to the subcarriers 204 or a number of RBs similar to the RBs 210) that may be used for sidelink transmissions. In some aspects, a scheduling assignment (e.g., included in SCI 330) may be transmitted in sub-channels using specific RBs across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 302 may operate using a transmission mode where resource selection and/or scheduling is performed by the UE 302 (e.g., rather than a base station 105). In some aspects, the UE 302 may perform resource selection and/or scheduling by sensing channel availability for transmissions. In some aspects, the UE 302 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 302 may perform resource selection and/or scheduling using SCI 330 received in the PSCCH 315, which may indicate occupied resources, channel parameters, and/or the like. Additionally, or alternatively, the UE 302 may perform resource selection and/or scheduling by determining a channel busy rate (CBR) associated with various sidelink channels, which may be used for rate control (e.g., by indicating a maximum number of resource blocks that the UE 302 can use for a particular set of subframes).

In the transmission mode where resource selection and/or scheduling is performed by a UE 302, the UE 302 may generate sidelink grants, and may transmit the grants in SCI 330. A sidelink grant may indicate, in some aspects, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 302 may generate a sidelink grant that indicates one or more parameters for semi-persistent scheduling (SPS), such as a periodicity of a sidelink transmission. Additionally, or alternatively, the UE 302 may generate a sidelink grant for event-driven scheduling, such as for an on-demand sidelink message.

In some aspects, PSFCH resources may be from the sidelink resource pool. There may be a period for PSFCH transmission in the resource pool. In some aspects, the sidelink resource pool may include a plurality of slots, and the PSFCH resources may be allocated at every one, two, or four slots. In some aspects, in a slot including a PSFCH, the PSFCH resource may be located after a PSSCH and a minimum time gap (e.g., about 1 symbol) for PSFCH.

As indicated above, FIG. 3 is provided as an aspect. Other aspects may differ from what is described with respect to FIG. 3.

Figure 4A:
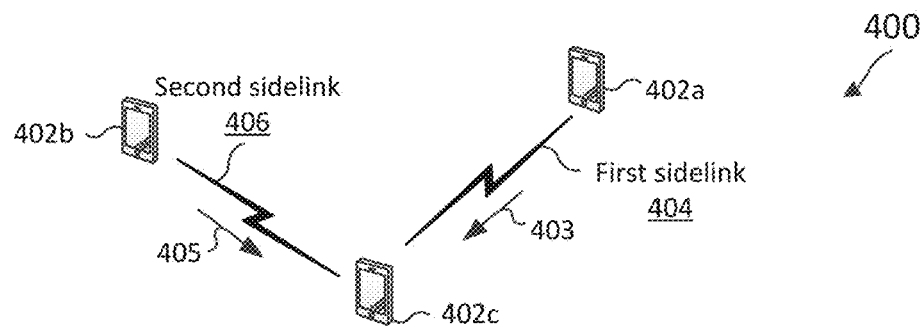
FIG. 4A illustrates a sidelink communication scenario according to some aspects of the present disclosure.
Figure 4B:
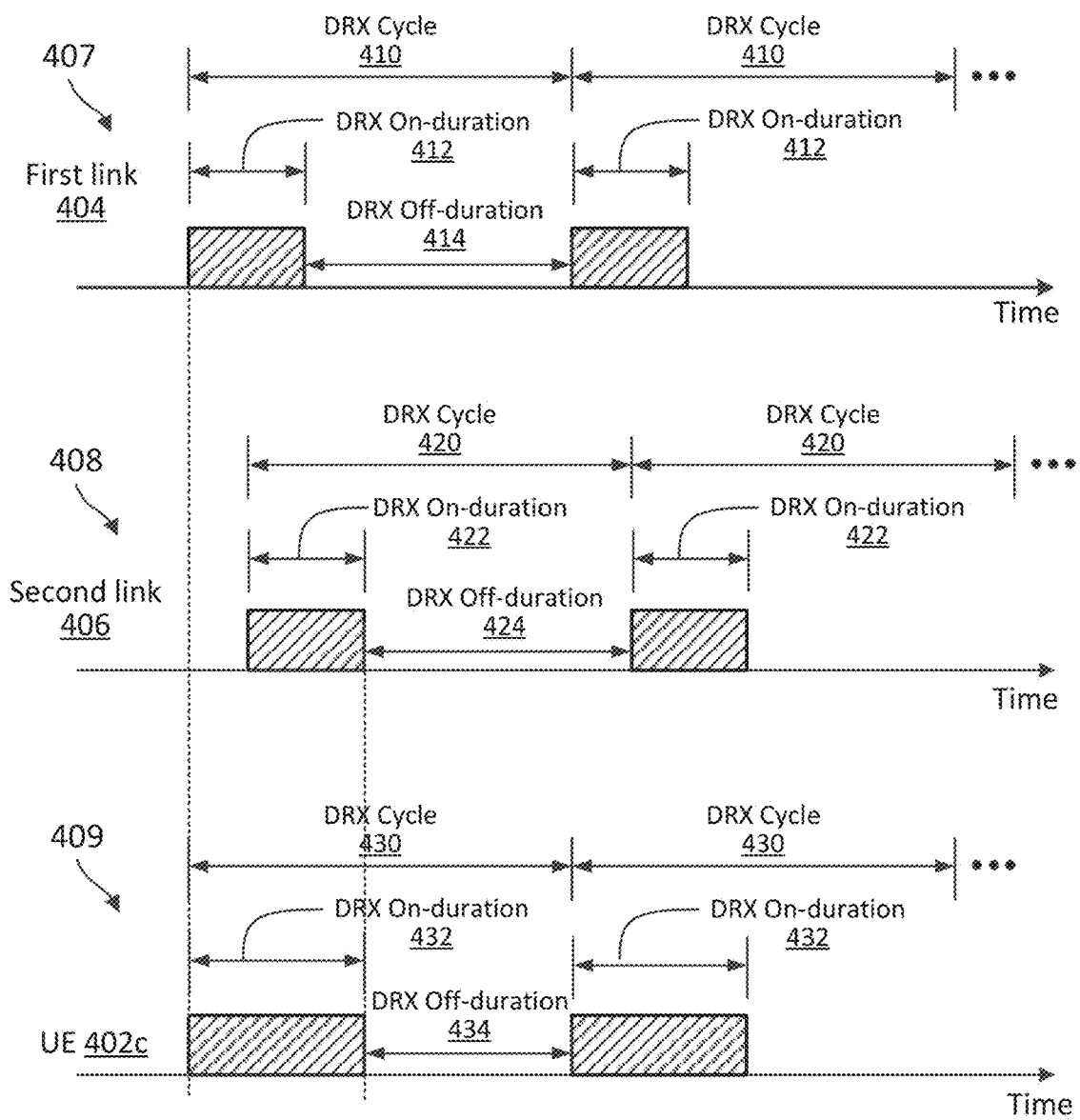
FIG. 4B is a timing diagram illustrating discontinuous reception (DRX) operations in a sidelink communication scenario according to some aspects of the present disclosure.

As explained above, it may be desirable to apply DTX and/or DRX techniques to sidelink communications to allow for power saving at UEs (e.g., the UEs 115 and/or 302). FIGS. 4A and 4B are discussed in relation to each other to illustrate DRX operations in sidelink. FIG. 4A illustrates a sidelink communication scenario 400 according to some aspects of the present disclosure. The scenario 400 may correspond to a sidelink communication scenario among UEs 115 in the network 100. For simplicity, FIG. 4A illustrates one sidelink receiving UE 402 (e.g., UE 402c) in communications with two other sidelink transmitting UEs 402 (e.g. the UE 402a and the UE 402b), but the UE 402c may communicate with a greater number of UEs 402 (e.g., the about 3, 4, 3, 6, 7, 8, 9, 10, or more), and in some instances, the UE 402c may also operate as a sidelink transmitting UE. The UEs 402 may be similar to the UEs 115.

In the scenario 400, the UE 402c may communicate with the UE 402a over a first sidelink 404 and with the UE 402b over a second sidelink 406. The first sidelink 404 and the second sidelink 406 can be over any suitable frequency band (e.g., a licensed band or an unlicensed band). The UE 402c and the UE 402a may establish a connection with each other for unicast communication over the first sidelink 404. The UE 402c and the UE 402a may establish the connection in a variety of ways. For example, in some instances, the UE 402c may perform sidelink discovery based on sidelink broadcast information provided by the UE 402a or another UE (e.g., an anchor UE). The sidelink broadcast information may include an indication of the presences of the UE 402a available for communications, a configuration of a sidelink resource pool (e.g., including one or more symbols in time and/or one or more subcarriers in frequency) that may be used for sidelink communication. The UE 402c may exchange various messages (e.g., an RRC connection request, an RRC connection response, and/or an RRC connection establishment message) with the UE 402a to establish the sidelink connection. In some other instances, a BS (e.g., the BSs 105) in communication with the UE 402c and/or the UE 402a may assist the sidelink connection establishment, for example, by providing the UE 402c and/or the UE 402a with a configuration for a sidelink resource pool. In a similar way, the UE 402c and the UE 402b may establish a connection with each other for unicast communication over the second sidelink 406.

In some aspects, the UE 402a may transmit sidelink transmissions 403 to the UE 402c over the first sidelink 404 according to a first transmission pattern (e.g., a DTX pattern), and the UE 402c may operate in a DRX mode with a DRX cycle (e.g., the DRX cycle 410 in FIG. 4B) configured in accordance with the UE 402a's transmission pattern. For example, in some instances, the UE 402a and the UE 402c can negotiate or coordinate with each other to determine the first transmission pattern and/or the DRX cycle. In a similar way, the UE 402b may transmit sidelink transmissions 405 to the UE 402c over the second sidelink 406 according to a transmission pattern, and the UE 402c may operate in a DRX mode with a DRX cycle (e.g., the DRX cycle 420 in FIG. 4B) configured in accordance with the UE 402b's transmission pattern.

FIG. 4B is a timing diagram illustrating operations in the sidelink communication scenario 400 according to some aspects of the present disclosure. In FIG. 4B, the x-axes represent time in some arbitrary units. FIG. 4B illustrates a DRX operation timeline 407 over the first sidelink 404, a DRX operation timeline 408 over the second sidelink 406, and a DRX operation timeline 409 at the sidelink receiving UE 402c. As shown by the DRX operation timeline 407, the UE 402c operates according to a DRX cycle 410 over the first sidelink 404. The DRX cycle 410 may start with a DRX on-duration 412, which may be deterministic and of a fixed time period, followed by a DRX off-duration 414, which may also be deterministic and of a fixed time period, and the DRX cycle 410 may be periodic. For example, a DRX cycle may be 100 ms, and the DRX on-duration may be 10 ms. In this example, the DRX cycle 410 may start at 0 ms (e.g., DRX cycle 410 including the DRX on-duration 412), 100 ms, 200 ms, 300 ms, and so on. The UE 402c may be awake or in an active state during the DRX on-durations 412 of the DRX cycles 410, and may switch to an inactive state (e.g., with one or more radio and/or baseband components, for example, in the modem 1412 and/or the radio frequency (RF) unit 1414 of FIG. 14, operating in a sleep state or at least a low-power state) during the DRX off-durations of the DRX cycles 410 to save power. Accordingly, the UE 402a may transmit, and the UE 402c may receive over the first sidelink 404, during the DRX on-durations 412 of the DRX cycles 410. Additionally, the UE 402a may not transmit to the UE 402c, and the UE 402c may not monitor for transmission from the UE 402a over the first sidelink 404 during the DRX off-durations 414 of the DRX cycles 410. In other words, the transmission pattern at the UE 402a may have transmission on-durations and transmission off-durations corresponding to the DRX on-durations 412 and DRX off-durations 414 of DRX cycle 410, respectively.

Further, as shown by the DRX operation timeline 408, the UE 402c operates according to a DRX cycle 420 over the second sidelink 406. The DRX cycle 420 may start with a DRX on-duration 422, which may be deterministic and of a fixed time period, followed by a DRX off-duration 424, which may also be deterministic and of a fixed time period, and the DRX cycle 420 may be periodic. For example, a DRX cycle may be 100 ms, and the DRX on-duration may be 10 ms. In this example, the DRX cycle 420 may start at 0 ms (e.g., DRX cycle 420 including the DRX on-duration 412), 100 ms, 200 ms, 300 ms, and so on. The UE 402c may be awake or in an active state during the DRX on-durations 422 of the DRX cycles 420, and may switch to an inactive state (e.g., with one or more radio and/or baseband components, for example, in the modem 1412 and/or the RF unit 1414 of FIG. 14, operating in a sleep state or at least a low-power state) during the DRX off-durations of the DRX cycles 420 to save power. Accordingly, the UE 402b may transmit, and the UE 402c may receive over the second sidelink 406, during the DRX on-durations 422 of the DRX cycles 420. Additionally, the UE 402b may not transmit to the UE 402c, and the UE 402c may not monitor for transmission from the UE 402b over the second sidelink 406 during the DRX off-durations 434 of the DRX cycles 420. In other words, the transmission pattern at the UE 402b may have transmission on-durations and transmission off-durations corresponding to the DRX on-durations 422 and DRX off-durations 424 of DRX cycle 420, respectively.

In some aspects, the DRX cycle 410 over the first sidelink 404 and the DRX cycle 420 over the second sidelink 406 may be different, for example, in terms of periodicities and/or DRX on-durations. For simplicity, FIG. 4B illustrates the DRX cycle 410 and the DRX cycle 420 having the same periodicities and DRX on-durations, but offset from each other in time. However, it should be understood that in other examples different DRX cycle periodicities and/or different DRX on-durations may be configured for different sidelinks.

As explained above, a sidelink receiving UE connected to multiple sidelink transmitting UEs via multiple sidelinks may perform sidelink transmission monitoring during DRX on-durations of each sidelink so that the sidelink receiving UE may be able to receive sidelink transmissions from all connected sidelink transmitting UEs. Accordingly, a sidelink receiving UE may remain in an active state based on a union of all DRX on-durations of the multiple sidelinks. In the illustrated example of FIG. 4B, the UE 402c may operate according to a combined DRX cycle 430 as shown by the DRX operation timeline 409. The DRX cycle 430 may include a DRX on-duration 432, followed by a DRX off-duration 434, and the DRX cycle 430 may repeat in time. The DRX on-duration 432 may correspond to a union of the DRX on-duration 412 for the first sidelink 404 and the DRX on-duration 422 for the second sidelink 406.

In operation, the UE 402c may monitor for sidelink transmissions during the DRX on-durations 432, which includes both the DRX on-durations 412 of the first sidelink 404 and the DRX on-durations 422 of the second sidelink 406. Accordingly, the UE 402a may predict or estimate a reception pattern at the UE 402c based on the DRX cycles 410 and the DRX cycle 420. The UE 402a can adjust a transmission pattern for communicating with the UE 402c over the first sidelink 404 by taking into account the DRX on-durations 422 of the second sidelink 406 in addition to the DRX on-durations 412 of the first sidelink 404. That is, the UE 402a can transmit to the UE 402c over the first sidelink 404 during a period outside of a DRX-on duration 412 of the first sidelink 404 if the period is within a DRX on-duration 422 of the second sidelink 406.

As can be observed in FIG. 4B, while a DRX cycle for a particular sidelink may be deterministic or fixed, a sidelink receiving UE can remain in an active state for a longer duration than a DRX on-duration of the DRX cycle due to the sidelink receiving UE being connected to multiple sidelinks with different DRX cycles. That is, the sidelink receiving UE may combine DRX on-durations from different sidelinks when the DRX on-durations from the different sidelinks are partially overlapping with each other or adjacent to one another.

Figure 5:
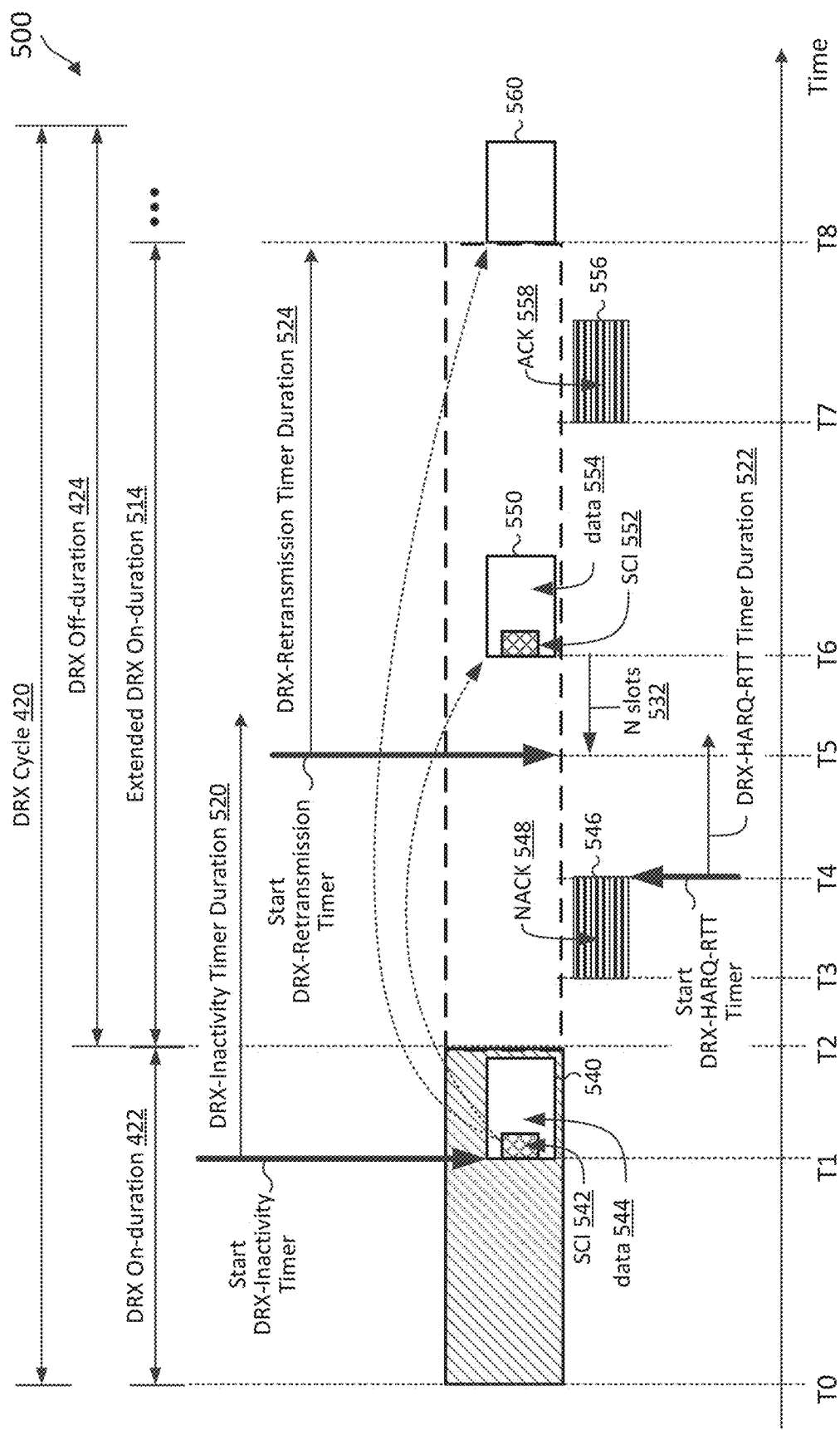
FIG. 5 illustrates a sidelink communication scenario with extended DRX on operations according to some aspects of the present disclosure.

As explained above, a sidelink receiving UE may also extend an on-duration of a DRX cycle based on certain timers, for example, triggered by certain transmissions. FIG. 5 illustrates a sidelink communication scenario 500 with extended DRX on operations according to some aspects of the present disclosure. FIG. 5 is discussed with reference to FIGS. 4A and 4B. For simplicity, FIG. 5 illustrates extended DRX on operations over the second sidelink 406 within a single DRX cycle 420. However, similar DRX on operations can occur during any DRX cycle 420 when triggered, for example, based on certain events and/or timers as will be discussed further below. Additionally, similar extended DRX on operations can occur over any sidelink (e.g., the first sidelink 404) between a pair of sidelink transmitting UE and sidelink receiving UE operating in a DRX mode. In FIG. 5, the x-axis represent time in some arbitrary units.

In the scenario 500, the UE 402c may operate in a DRX mode for communications with the UE 402b according to the DRX cycle 420. Accordingly, the UE 402c may be awake in an active state during the DRX on-duration, for example, performing SCI sensing and decoding to monitor for transmissions from the UE 402b. Under regular DRX (with no extension), the UE 402c may switch to an inactive state (e.g., configuring one or more radio components and/or transceiver components, for example, in the modem 1412 and/or the RF unit 1414 of FIG. 14, to operate in a sleep state or a low-power state) at the end of the DRX on-duration 422 and remain in the inactive state for the DRX off-duration 424. However, in scenario 500, the UE 402c may extend the DRX on-duration 422 by an extended DRX on-duration 514 based on various timers as will be discussed below.

During the DRX on-duration 422, the UE 402c may monitor for sidelink transmission. In this regard, the UE 402c may perform SCI sensing and SCI decoding to monitor for a sidelink transmission destined to the UE 402c. The SCI sensing and decoding may include receiving a signal from the channel, measuring the received signal energy, and performing blind SCI decoding on the received signal when the signal energy is above a certain threshold. If the UE 402c successfully decoded SCI from the signal, the UE 402c may determine whether the sidelink transmission (the received signal) is destined to the UE 402c. As explained above, SCI may include first stage SCI, which may be referred to as SCI-1, and second stage SCI, which may be referred to as SCI-2. SCI-1 may include a source ID identifying a source transmitter of the transmission and a destination ID identifying a target receiver. Accordingly, the UE 402c can determine whether the detected SCI is destined to the UE 402c based on the destination ID in the SCI. In the illustrated example of FIG. 5, the UE 402c detected SCI 542 in a sidelink resource 540 (e.g., a sidelink slot) from the SCI sensing and decoding. The SCI 542 may include SCI-1 and SCI-2. The UE 402c may determine that the sidelink transmission in the sidelink resource 540 is destined to itself based on a match between the received destination ID in the SCI-2 and the UE 402c's ID. Upon detecting the SCI 542 (SCI-1 and/or SCI-2) indicating the sidelink resource 540 carries data 544 destined to the UE 402c, the UE 402c may continue to decode the data 544, for example, based on transmission parameters such as MCS and/or resource information (e.g., time and frequency locations of the data 544 in the resource 540) indicated by the SCI 542.

In some aspects, when the UE 402c operates in the DRX mode, the UE 402c may start a DRX-inactivity timer upon detecting the SCI 542 destined to the UE 402c as shown by the arrow at time T1. In some aspects, the UE 402c may be pre-configured with a DRX-inactivity timer value, for example, based on an RRC configuration (e.g., configured by a BS 105 while the UE 402c is in coverage of the BS 105 or by another sidelink UE 115 or 402). Accordingly, the UE 402c may configure the DRX-inactivity timer with a timer duration 520 in accordance with the DRX-inactivity timer value. The UE 402c may remain in an active state and continue to perform SCI sensing and decoding while the DRX-inactivity timer is in progress or active. Depending on when the UE 402c detected the SCI 542, the UE 402c may remain in the active state beyond the DRX on-duration 422 based on the active DRX-inactivity timer. That is, the UE 402c may extend a DRX on-duration based on a DRX-inactivity timer. In some aspects, the UE 420c may restart the DRX-inactivity timer to further extend the DRX on-duration 422 if the UE 402c detected another SCI destined to the UE 402c during the DRX on-duration 422 at a later time.

In some aspects, communications over the second sidelink 406 may utilize HARQ techniques to improve communication reliability. Accordingly, the UE 402c may transmit an ACK/NACK feedback indicating a reception status of the data 544 to the sidelink transmitting UE 402b. For instance, if the UE 402c successfully decoded the data 544 from the sidelink transmission, the UE 402c may transmit an ACK feedback to the UE 402c. If, however, the UE 402c fails to decode the data 544 from the sidelink transmission, the UE 402c may transmit an NACK feedback so that the sidelink transmitting UE 402b may retransmit the data 544. In some aspects, a sidelink transmitting UE may reserve up to two future sidelink resources (e.g., within 32 upcoming sidelink slots) for retransmissions by indicating the reservations in SCI-1. For instance, the SCI 542 indicates a first sidelink reservation for a sidelink resource 550 (at time T6) and a second sidelink reservation for a sidelink resource 560 (at time T8). As an example, the UE 402c fails to decode the data 544, and thus transmits an NACK feedback 548 to the sidelink transmitting UE 402b in a PSFCH resource 546 at time T3. Upon receiving the NACK feedback 548, the sidelink transmitting UE 402b may retransmit the data 544 in a next reserved sidelink resource 550. As shown, the sidelink transmitting UE 402b transmits, and the UE 402c receives, SCI 552 and data 554 (retransmission of the data 544) in the sidelink resource 550.

In some aspects, when the UE 402c operates in the DRX mode, the UE 402c may start a DRX-retransmission timer after transmitting a NACK feedback. As shown, the UE 402c starts a DRX-retransmission timer N slots 532 prior to the retransmission (in the next reserved sidelink resource 550) as shown by the arrow at time T5. In some aspects, the UE 402c may be preconfigured with the value N and/or a DRX-retransmission timer duration value, for example, based on an RRC configuration (e.g., configured by a BS 105 while the UE 402c is in coverage of the BS 105 or by another sidelink UE 115, 302, or 402). Accordingly, the UE 402c may configure the DRX-retransmission timer with a timer duration 524 in accordance with the DRX-retransmission timer value. The UE 402c may remain in an active state and continue to perform SCI sensing and decoding while the DRX-retransmission timer is in progress or active. As such, the UE 402c may further extend a DRX on-duration based on a DRX-retransmission timer. In this way, the UE 402c may continue to remain in the active state to receive the retransmission in the sidelink resource 550. As an example, the UE 402c may successfully decode the data 554 from the retransmission, for example, based on transmission parameters such as MCS and/or resource information (e.g., time and frequency locations of the data 554 in the resource 550) indicated by the SCI 552. Accordingly, at time T7, the UE 402c may retransmit an ACK feedback 558 to the sidelink transmitting UE in a PSFCH resource 556. After the UE 402c successfully decoded the data 554 from the retransmission, the UE 402c may switch to an inactive state when the DRX-retransmission timer expires, for example, at time T8.

In other instances, if the UE 402c fails to decode the data 554, the UE 402c may transmit another NACK feedback, which may in turn restart the DRX-retransmission timer N slots 532 prior to the next reserved sidelink resource 560 so that the UE 402c may attempt to receive and decode another retransmission from the sidelink transmitting UE. In any case, the UE 402c may extend a DRX on-duration as long as at least one of the DRX-inactive timer or the DRX-retransmission timer is in progress or active. As shown in FIG. 5, the UE 402c may remain in an active state over an extended DRX on-duration 514 until time T8 based on the DRX-inactivity timer started at time T4 and the DRX-retransmission timer started at time T5.

In some aspects, the sidelink resources 540, 550, and 560 and the PSFCH resources 546 and 556 may be within a sidelink resource pool configured for communication between the UE 402c and the sidelink transmitting UE. The sidelink resource pool may include a set of time-frequency resources spanning one or more symbols (e.g., the symbols 206) or one or more slots (e.g., the slots 202) in time (contiguous and/or non-contiguous) and one or more subcarriers (e.g., the subcarriers 204) in frequency (contiguous and/or non-contiguous). In some aspects, the sidelink resources 540, 550, and 560 and the PSFCH resources 546 and 556 may be located within different sidelink resource pools.

In some further aspects, the UE 402c may optionally stop monitoring for sidelink transmissions for a period of time after transmitting the NACK feedback 548 in order to save power. For instance, the UE 402c may start a DRX-HARQ-RTT timer after transmitting the NACK feedback 548 as shown by arrow at time T4. In some aspects, the UE 402c may be pre-configured with a DRX-HARQ-RTT timer value, for example, based on an RRC configuration (e.g., configured by a BS 105 while the UE 402c is in coverage of the BS 105 or by another sidelink UE 115, 302, or 402). Accordingly, the UE 402c may configure the DRX-HARQ-RTT timer with a timer duration 522 in accordance with the DRX-HARQ-RTT timer value. The DRX-HARQ-RTT timer value may be based on a RTT time between the UE 402c and the sidelink transmitting UE. The UE 402c may switch one or more radio components and/or transceiver components, for example, in the modem 1412 and/or the RF unit 1414 of FIG. 14, to a sleep state or a low-power state to conserve power since the NACK feedback 548 may arrive at the sidelink transmitting UE after a propagation time and a retransmission from the sidelink transmitting UE may also take certain propagation time to arrive at the UE 402c. The UE 402c may remain in the inactive state while the DRX-HARQ-RTT timer is in progress or active. Accordingly, the UE 402c may be in an active state if at least one of the DRX-inactive timer or the DRX-retransmission timer is in progress and the DRX-HARQ-RTT timer is not in progress.

According to aspects of the present disclosure, a sidelink transmitting UE connected to a sidelink receiving UE over a first sidelink may dynamically determine or adjust a transmission pattern (for transmitting to the sidelink receiving UE) based on an extended DRX duration over a second sidelink between the sidelink receiving UE and another sidelink transmitting UE. For instance, the sidelink transmitting UE may perform SCI sensing and/or NACK monitoring associated with the second sidelink to determine whether any DRX-inactivity timer and/or DRX-retransmission timer are activated the sidelink receiving UE for communications over the second sidelink at. The sidelink transmitting UE may determine an extended DRX on-duration at the sidelink receiving UE based on the activation and/or deactivation of the DRX-inactivity timer and/or DRX-retransmission timer. Additionally or alternatively, the sidelink receiving UE may provide the sidelink transmitting UE with assistance information associated with an extended DRX on-duration on the second sidelink. Since the sidelink receiving UE remains in an active state during an extended DRX on-duration, the sidelink transmitting UE can utilize the extended DRX on-duration for transmission to the sidelink receiving UE. For instance, the sidelink transmitting UE may schedule a transmission for the sidelink receiving UE over the first sidelink during a period that is outside of a DRX on-duration of the first sidelink, but within the extended DRX on-duration of the second sidelink. Mechanisms for extending a DRX-on duration at a sidelink receiving UE and for determining a dynamic transmission pattern at a sidelink transmitting UE are discussed in greater detail below.

Figure 6:
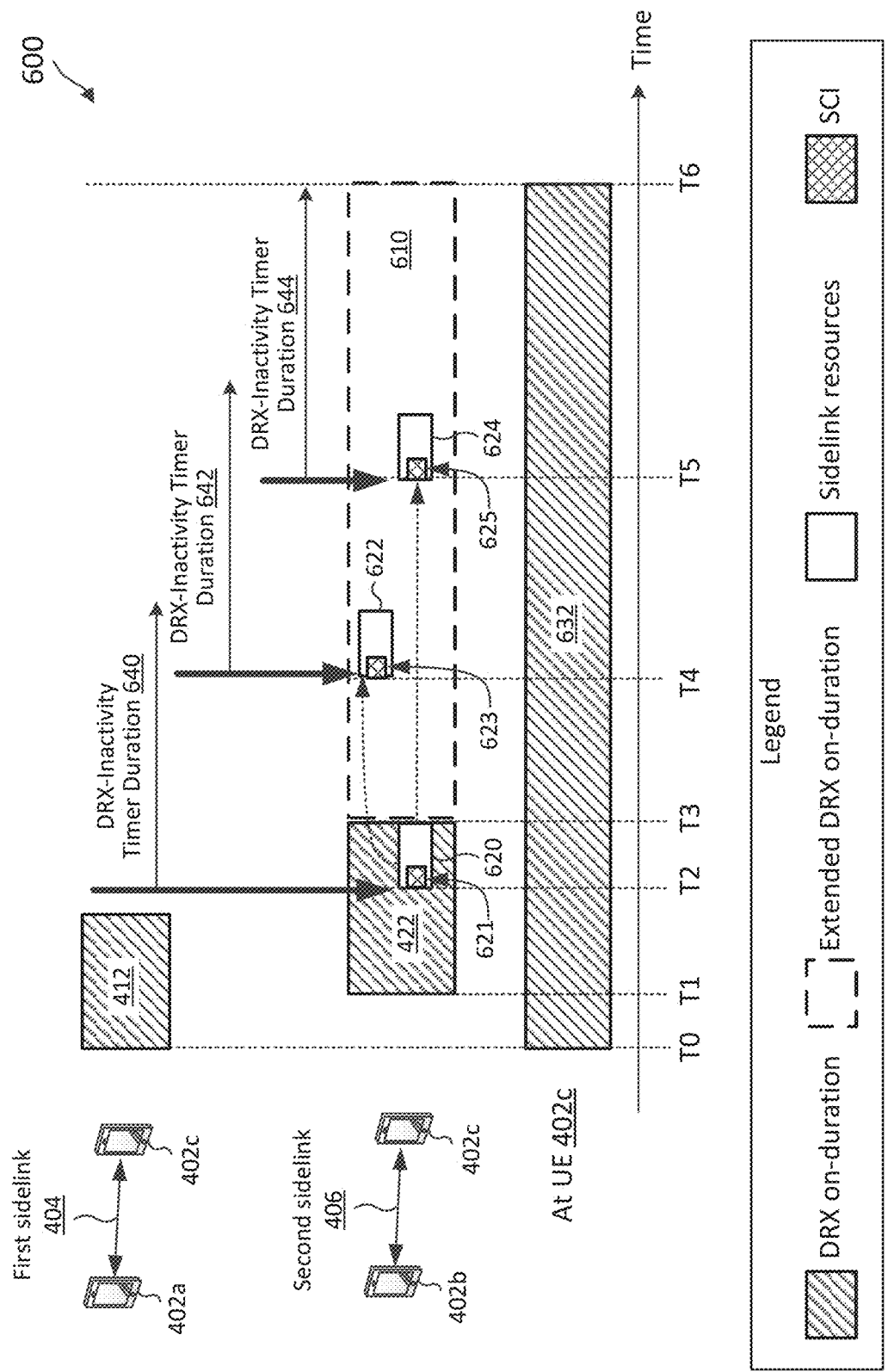
FIG. 6 illustrates a sidelink DRX extended-on configuration scheme according to some aspects of the present disclosure.
Figure 7:
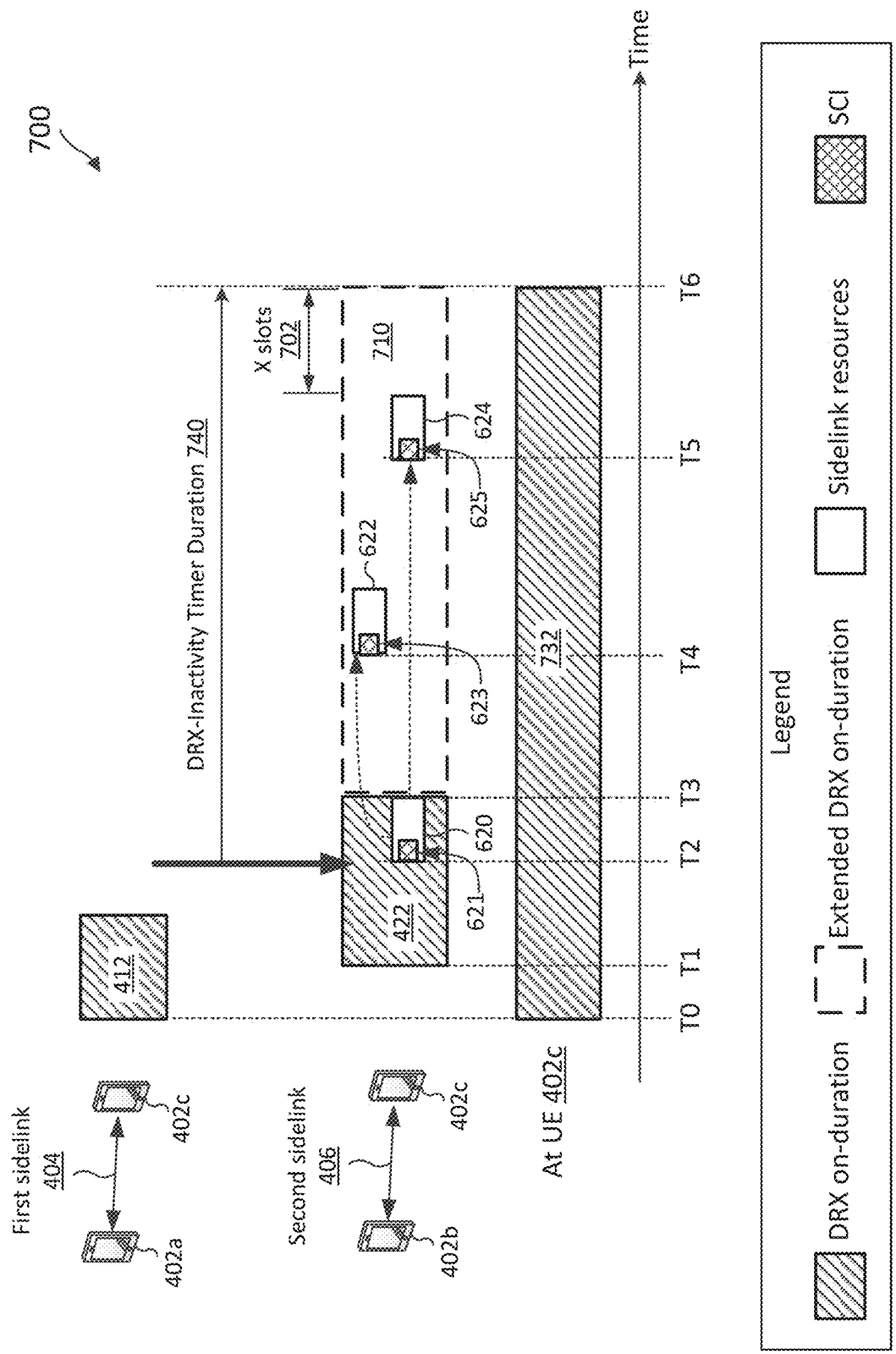
FIG. 7 illustrates a sidelink DRX extended-on configuration scheme according to some aspects of the present disclosure.
Figure 8:
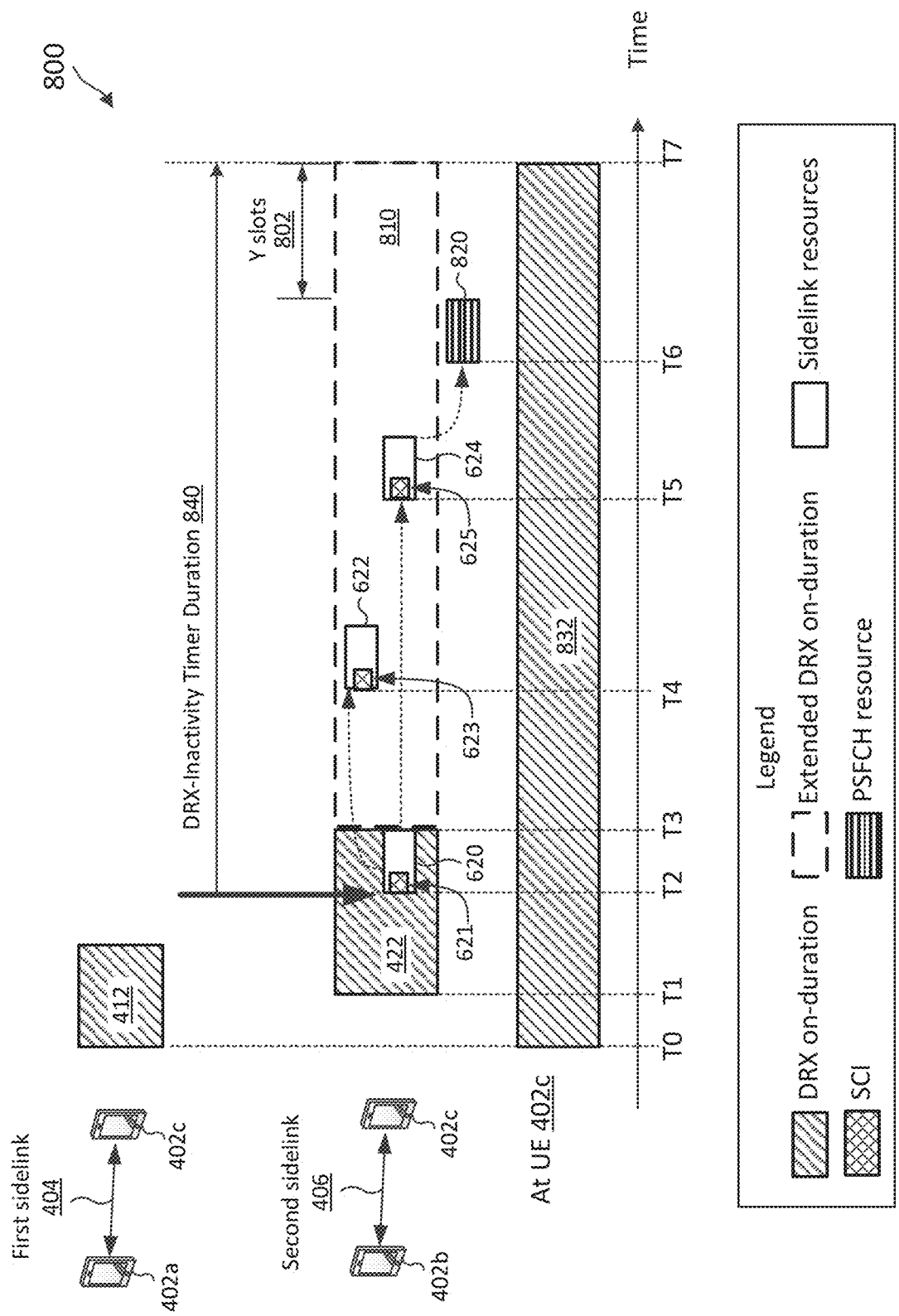
FIG. 8 illustrates a sidelink DRX extended-on configuration scheme according to some aspects of the present disclosure.

In some aspects, a sidelink receiving UE may start a DRX-inactivity timer upon receiving SCI destined to the sidelink receiving UE. FIGS. 6-8 illustrate various mechanisms for starting and/or configuring a DRX-inactivity timer to extend a DRX on-duration. In FIGS. 6-8, the x-axes represent time in some arbitrary units, the diagonal stripe pattern-filled boxes represent DRX on-durations, the dash-outlined empty-filled boxes represent extended DRX on-durations, the solid-outlined empty-filled boxes represent sidelink resources, and the crisscross pattern-filled boxes represent SCI is detected or being reserved by SCI).

FIG. 6 illustrates a sidelink DRX extended-on configuration scheme 600 according to some aspects of the present disclosure. The scheme 600 may be employed by UEs such as the UEs 115, 302, and 402. In particular, a sidelink UE may extend a DRX on-duration by starting/restarting a DRX-inactivity timer as shown in the scheme 600. In FIG. 6, the x-axis represents time in some arbitrary units. The scheme 600 is described using the same sidelink communication configuration as in FIGS. 4A-4B, where a sidelink receiving UE 402c may be in communication with a sidelink transmitting UE 402a over a first sidelink 404 according to a DRX cycle 410 and with another sidelink transmitting UE 402b over a second sidelink 406 according to a DRX cycle 420. For simplicity, FIG. 6 illustrates operations over a single DRX cycle 410 and a single DRX cycle 420, but similar operations may occur in a subsequent DRX cycle 410 and/or a subsequent DRX cycle 420. Additionally, FIG. 6 may use the same reference numerals as in FIGS. 4A-4B for simplicity's sake.

At a high level, in the scheme 600, the UE 402c may start or restart a DRX-inactivity timer upon detecting a sidelink transmission (e.g., SCI) destined to the UE 402c and may configure the DRX-inactivity timer with a duration to cover up to a next sidelink reservation indicated by the SCI. In this way, the UE 402c may remain in an active state to receive the sidelink transmission to be transmitted in a next reserved sidelink resource. If the current resource (where the SCI I detected from) is a last reserved resource, the sidelink receiving UE 402c may configure the DRX-inactivity timer with a predefined timer duration.

In the illustrated example of FIG. 6, the UE 402c may operate in an active state during a DRX on-duration 412 (starting at time T0) for the first sidelink 404 and during the DRX on-duration 422 (starting at time T1) for the second sidelink 406. The UE 402c may monitor for SCI while in the active state from time T0 to time T3.

At time T2, the UE 402b may transmit, and the UE 402c may receive over the second link 406, first SCI 621 in a sidelink resource 620. The UE 402c may decode the first SCI 621 and determine that the first SCI 621 is destined to the UE 402c, for example, based on a destination ID in the first SCI 621 matching an ID that identifies the UE 402c. Further, the first SCI 621 may indicate one or more sidelink reservations, for example, for retransmissions. As an example, the SCI may indicate a reservation for a sidelink resource 622 at time T4, and a reservation for a sidelink resource 624 at time T5 as shown by the dotted arrows. After decoding the first SCI 621, the UE 402c may decode data from the sidelink resource 620, for example, based on transmission parameters such as MCS and/or resource information (e.g., time and frequency locations of the data in the resource 620) indicated by the first SCI 621.

Further, upon detecting the first SCI 621 destined to the UE 402c, the UE 402c may start a DRX-inactivity timer as shown by the arrow at time T2. The UE 402c may configure the DRX-inactivity timer with a duration 640 long enough to cover the next reserved sidelink resource 622. The UE 402c may remain in the active state and continue to monitor for SCI after the end of the DRX on-duration 422 based on the DRX-inactivity timer is in progress.

At time T4, the UE 402b may transmit, and the UE 402c may receive over the second link 406, second SCI 623 in the reserved sidelink resource 622. The UE 402c may decode the second SCI 623 and determine that the second SCI 623 is destined to the UE 402c. After decoding the second SCI 623, the UE 402c may decode data from the sidelink resource 622, for example, based on transmission parameters such as MCS and/or resource information (e.g., time and frequency locations of the data in the resource 622) indicated by the second SCI 623.

Further, upon detecting the second SCI 623, the UE 402c may restart the DRX-inactivity timer (shown by the arrow at time T3) with a duration 642 to cover the next reserved sidelink resource 624. The restarting of the DRX-inactivity timer may include resetting the DRX-inactivity timer and setting the DRX-inactivity timer with the duration 642. The UE 402c may remain in the active state and continue to monitor for SCI while the DRX-inactivity timer is in progress.

At time T5, the UE 402b may transmit, and the UE 402c may receive over the second link 406, third SCI 625 in the reserved sidelink resource 624. The UE 402c may decode the third SCI 625 and determine that the third SCI 625 is destined to the UE 402c. After decoding the third SCI 625, the UE 402c may decode data from the sidelink resource 624, for example, based on transmission parameters such as MCS and/or resource information (e.g., time and frequency locations of the data in the resource 624) indicated by the third SCI 625.

Further, upon detecting the third SCI 625, the UE 402c may restart the DRX-inactivity timer (shown by the arrow at time T5) with a duration 644. The restarting of the DRX-inactivity timer may include resetting the DRX-inactivity timer and setting the DRX-inactivity timer with the duration 644. Since the sidelink resource 624 is a last reserved sidelink resource indicated by the third SCI 621, the duration 644 may be preconfigured, for example, including Q number of slots. The UE 402c may remain in the active state and continue to monitor for SCI while the DRX-inactivity timer is in progress, for example, until time T6.

As can be seen in FIG. 6, the UE 402c may have an extended DRX on-duration 610 extended from the DRX on-duration 422 based on the DRX-inactivity timer. Thus, the UE 402c may remain in an active state or a total or aggregated DRX on-duration 632 from time T0 to time T6 (covering the DRX on-duration 412 for the first sidelink 404, the DRX on-duration 422 for the second sidelink 406, and the extended DRX on-duration 610 for the second sidelink 406). Furthermore, in some instances, the extended DRX on-duration 610 may vary based on a number of retransmissions before a sidelink transmission is received correctly by the UE 402c, for example, when the sidelink resources 622 and 624 are reserved for retransmissions of data in the sidelink resource 620.

FIG. 7 illustrates a sidelink DRX extended-on configuration scheme 700 according to some aspects of the present disclosure. The scheme 700 may be employed by UEs such as the UEs 115, 302, and 402. In particular, a sidelink UE may extend a DRX on-duration by starting/restarting a DRX-inactivity timer as shown in the scheme 700. In FIG. 7, the x-axis represents time in some arbitrary units. The scheme 700 is described using the same sidelink communication configuration as in FIGS. 4A-4B and the same SCI transmission and reservations over the second sidelink 406 as in FIG. 6. For simplicity, FIG. 7 illustrates operations over a single DRX cycle 410 and a single DRX cycle 420, but similar operations may occur in a subsequent DRX cycle 410 and/or a subsequent DRX cycle 420. Additionally, FIG. 7 may use the same reference numerals as in FIGS. 4A-4B and 6 for simplicity's sake.

In the scheme 700, the UE 402c may start a DRX-inactivity timer upon detecting a sidelink transmission (e.g., SCI) destined to the UE 402c and may configure the DRX-inactivity timer with a duration to cover the last resource reserved by the SCI and an additional X number of slots after the last reserved resource. As shown, upon detecting the first SCI 621 destined to the UE 402c, the UE 402c may start a DRX-inactivity timer as shown by the arrow at time T2. The UE 402c may configure the DRX-inactivity timer with a duration 740 such that the DRX-inactivity timer will expire X slots 702 after the last reserved resource 624, where X may be a positive integer. The UE 402c may remain in the active state and continue to monitor for SCI after the end of the DRX on-duration 422 based on the DRX-inactivity timer is in progress.

As can be seen in FIG. 7, the UE 402c may have an extended DRX on-duration 710 extended from the DRX on-duration 422 based on the DRX-inactivity timer. Thus, the UE 402c may remain in an active state or a total or aggregated DRX on-duration 732 from time T0 to time T6

(covering the DRX on-duration 412 for the first sidelink 404, the DRX on-duration 422 for the second sidelink 406, and the extended DRX on-duration 710 for the second sidelink 406).

In some aspects, the first sidelink 404 and the second sidelink 406 may be over an unlicensed band (a shared channel), and thus each of the UE 402a and the UE 402b may perform an LBT prior to transmitting over the first sidelink 404 and the second sidelink 406, respectively. For instance, the UE 402b may perform an LBT prior to transmitting in the sidelink resource 620 and the LBT may be a pass (indicating the channel is clear for transmission). As such, the UE 402b may transmit the first SCI 621 and associated data in the sidelink resource 620. The UE 402b may reserve the sidelink resources 622 and 624 for retransmissions. The UE 402c may fail receive and decode data from the sidelink resource correctly, and thus may transmit a NACK (not shown) to the UE 402b. In response, the UE 402b may determine to retransmit the data using the resource 622. For example, the UE 402b may perform an LBT prior to the sidelink resource 622 and may fail the LBT, and thus the UE 402b may not retransmit the data in the sidelink resource 622. At a later time, the UE 402b may reattempt an LBT prior to the sidelink resource 624 and the LBT may pass, and thus the UE 402b may transmit the third SCI 625 and a retransmission of the data in the sidelink resource 624. The scheme 700 may be suitable for such a scenario since the UE 402c may remain in an active state even though the UE 402c may not receive any SCI from the UE 402b in the reserved sidelink resource 622.

In some further aspects, the UE 402b may perform blind retransmission when operating over an unlicensed band. In this regard, after the UE 402b transmitted sidelink data in the sidelink resource 620, the UE 402b may retransmit the data in the next reserved sidelink resource 622 without receiving a NACK feedback from the UE 402c. Again, the UE 402b may perform an LBT prior to the transmission and may fail the LBT. Thus, UE 402b may not retransmit the data in the sidelink resource 622. At a later time, the UE 402b may reattempt an LBT prior to the sidelink resource 624 and the LBT may pass, and thus the UE 402b may transmit the third SCI 625 and a retransmission of the data in the sidelink resource 624. Thus, the scheme 700 may also be suitable for such a scenario since the UE 402c may remain in an active state even though the UE 402c may not receive any SCI from the UE 402b in the reserved sidelink resource 622.

FIG. 8 illustrates a sidelink DRX extended-on configuration scheme 800 according to some aspects of the present disclosure. The scheme 800 may be employed by UEs such as the UEs 115, 302, and 402. In particular, a sidelink UE may extend a DRX on-duration by starting/restarting a DRX-inactivity timer as shown in the scheme 800. In FIG. 8, the x-axis represents time in some arbitrary units. The scheme 800 is described using the same sidelink communication configuration as in FIGS. 4A-4B and the same SCI transmission and reservations over the second sidelink 406 as in FIG. 6. For simplicity, FIG. 8 illustrates operations over a single DRX cycle 410 and a single DRX cycle 420, but similar operations may occur in a subsequent DRX cycle 410 and/or a subsequent DRX cycle 420. Additionally, FIG. 8 may use the same reference numerals as in FIGS. 4A-4B and 6 for simplicity's sake.

In the scheme 800, the UE 402c may start a DRX-inactivity timer upon detecting a sidelink transmission (e.g., SCI) destined to the UE 402c and may configure the DRX-inactivity timer with a duration to cover a PSFCH resource associated with the last resource reserved by the SCI and an additional Y number of slots after the PSFCH resource. As shown, upon detecting the first SCI 621 destined to the UE 402c, the UE 402c may start a DRX-inactivity timer as shown by the arrow at time T2. The UE 402c may configure the DRX-inactivity timer with a duration 840 such that the DRX-inactivity timer will expire Y slots 802 after a PSFCH resource 820 associated with the last reserved resource 624, where Y may be a positive integer. In this way, the UE 402c may remain in an active state after the end of the PSFCH resource 820, and thus may be able to transmit an ACK/NACK feedback for a transmission received in the sidelink resource 624. In some aspects, the value Y (for the Y slots 802) may be the same as the value X (for the X slots 702 of FIG. 7). In other aspects, the value Y (for the Y slots 802) may be different from the value X (for the X slots 702 of FIG. 7.

As can be seen in FIG. 8, the UE 402c may have an extended DRX on-duration 810 extended from the DRX on-duration 422 based on the DRX-inactivity timer. Thus, the UE 402c may remain in an active state or a total or aggregated DRX on-duration 832 from time T0 to time T7 (covering the DRX on-duration 412 for the first sidelink 404, the DRX on-duration 422 for the second sidelink 406, and the extended DRX on-duration 810 for the second sidelink 406).

Similar to the scheme 700, the scheme 800 may be suitable for use when the first sidelink 404 and the second sidelink 406 are over an unlicensed band and/or when blind retransmission is performed by a peer sidelink transmitting UE as discussed above.

While FIGS. 6-8 are discussed in the context of SCI indicating reserved resources for retransmissions, a sidelink transmitting UE may also include, in the SCI, resource reservations for new transmissions, for example, when operating over a licensed band.

In some aspects, the UE 402c may further start a DRX-retransmission timer and/or a DRX-HARQ-RTT timer as discussed above with reference to FIG. 5 when utilizing the scheme 600, 700, or 800. For instance, the UE 402c may start a DRX-retransmission timer and/or a DRX-HARQ-RTT timer as discussed above with reference to FIG. 5 based on transmitting a NACK feedback to the UE 402b for data in the sidelink resource 620, 622, or 624. Accordingly, the UE 402a may monitor for SCI and/or NACKs (e.g., layer 1 (L1) signaling) over the second sidelink 406 and may determine or adjust a transmission pattern for communicating with the UE 402c over the first sidelink 404 based on knowledge of an extended DRX-on duration (e.g., the extended DRX on-durations 610, 710, and 810) during which the UE 402c may stay awake and perform SCI monitoring. For instance, the UE 402a may transmit to the UE 402c over the first sidelink 404 during a period that is outside of a DRX on-duration of the first sidelink 404, but within the extended DRX on-duration of the second sidelink 406 as will be discussed in greater detail below with reference to FIG. 9. Additionally or alternatively, the UE 402c may provide the UE 402a of the first sidelink 404 with assistance information related to an extended DRX on-duration at the UE 402c due to communications over the second sidelink 406 as will be discussed in greater detail below with reference to FIG. 10.

Figure 9:
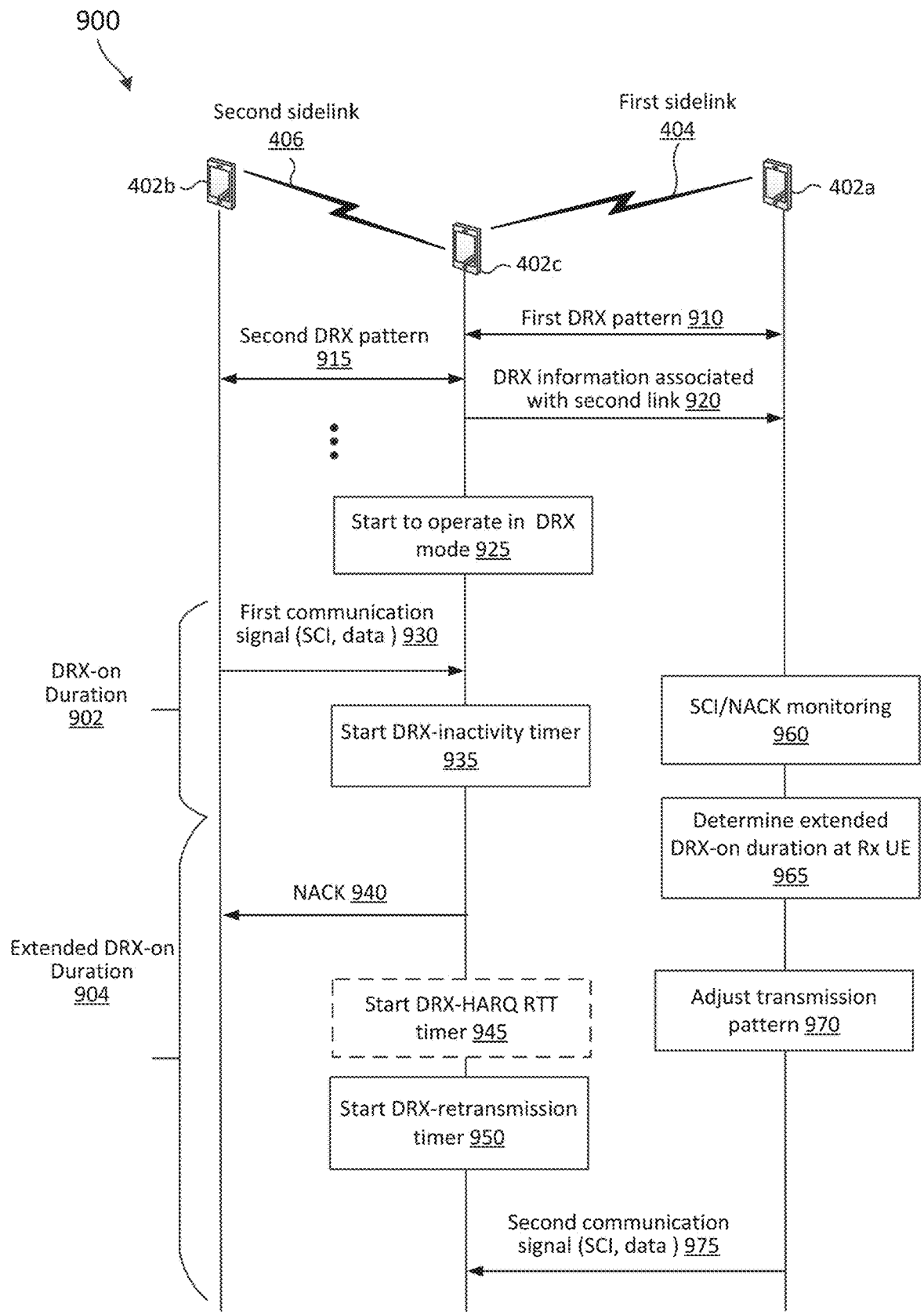
FIG. 9 is a sequence diagram illustrating a sidelink communication method that implements a dynamic transmission pattern based on DRX extended-on operations according to some aspects of the present disclosure.

FIG. 9 is a sequence diagram illustrating a sidelink communication method 900 that implements a dynamic transmission pattern based on DRX extended-on operations according to some aspects of the present disclosure. The method 900 may be implemented among the UE 402a, 402b, and 402c. The method 900 is described with reference to the sidelink configuration shown in FIG. 4A. The method 900 may utilize similar mechanisms as discussed above with respect to FIGS. 4B, 6, 7, and/or 8. In some aspects, the method 900 may start after the sidelink receiving UE 402c had established a connection over a first sidelink 404 with the sidelink transmitting UE 402a and a connection over a second sidelink 406 with the sidelink receiving UE 402b as discussed above with reference to FIG. 4A. In some aspects, the UE 402a, 402b, 402c may utilize one or more components, such as the processor 1402, the memory 1404, the sidelink extended DRX-on module 1408, the transceiver 1410, the modem 1412, and the one or more antennas 1416 with reference to FIG. 14, to execute the actions of the method 900. As illustrated, the method 900 includes a number of enumerated actions, but aspects of the method 900 may include additional action(s) before, after, and in between the enumerated action. In some aspects, one or more of the enumerated actions may be omitted or performed in a different order.

At action 910, the sidelink transmitting UE 402a exchanges a first DRX pattern with the sidelink receiving UE 402c for communications over the first sidelink 404. In some instances, the first DRX pattern may include alternating DRX on-durations and DRX off-durations similar to the DRX cycle 410 shown in FIG. 4B. In some instances, the sidelink transmitting UE 402a may determine the first DRX pattern based on a transmission pattern to be used by the UE 402a for transmitting to the UE 402c. Further, the sidelink transmitting UE 402a may transmit, and the sidelink receiving UE 402c may receive, a configuration for the first DRX pattern (e.g., indicating a starting time, an ending time, or a duration of a DRX on-duration and periodicity of the DRX cycle). In other instances, the sidelink receiving UE 402c may determine the first DRX pattern. Further, the sidelink receiving UE 402c may transmit, and the sidelink transmitting UE 402a may receive, a configuration for the first DRX pattern (e.g., indicating a starting time, an ending time, or a duration of a DRX on-duration and periodicity of the DRX cycle).

At action 915, the sidelink transmitting UE 402b exchanges a second DRX pattern with the sidelink receiving UE 402c for communications over the second sidelink 406. In some instances, the second DRX pattern may include alternating DRX on-durations and DRX off-durations similar to the DRX cycle 420 shown in FIG. 4B. In some instances, the sidelink transmitting UE 402b may determine the second DRX pattern based on a transmission pattern to be used by the UE 402b for transmitting to the UE 402c. Further, the sidelink transmitting UE 402b may transmit, and the sidelink receiving UE 402c may receive, a configuration for the second DRX pattern (e.g., indicating a starting time, an ending time, or a duration of a DRX on-duration and periodicity of the DRX cycle). In other instances, the sidelink receiving UE 402c may determine the second DRX pattern. Further, the sidelink receiving UE 402c may transmit, and the sidelink transmitting UE 402b may receive, a configuration for the second DRX pattern (e.g., indicating a starting time, an ending time, or a duration of a DRX on-duration and periodicity of the DRX cycle).

At action 920, the sidelink receiving UE 402c transmits, and the sidelink transmitting UE 402a receives, DRX information associated with the second sidelink 406. The DRX information may include a DRX-inactivity timer configuration mechanism, for example, indicating whether the sidelink receiving UE 402c utilizes the scheme 600, 700, or 800 discussed above with reference to FIG. 6, 7, or 8, respectively, to start and/or restart a DRX-inactivity timer while operating in a DRX mode. In some aspects, the selection of the scheme 600, 700, or 800 may be band dependent. For instance, the sidelink receiving UE 402c may select the scheme 600 when operating in a licensed band and may select the scheme 700 or 800 when operating over an unlicensed band. In other aspects, the DRX-inactivity timer configuration mechanism can be configured by an upper layer (e.g., an RRC layer) or based on a layer 1 (L1) indication received at the sidelink receiving UE 402c. For instance, the sidelink receiving UE 402c may receive the RRC configuration or the L1 indication from a BS (e.g., the BSs 105) while the sidelink receiving UE 402c is in coverage of the BS or from an anchoring sidelink UE that manages sidelink communications among a group of UEs. Alternatively, the sidelink receiving UE 402c may be pre-configured with a default DRX-inactivity configuration mechanism (e.g., the scheme 700). Additionally or alternatively, the DRX information may include a predefined duration value (e.g., the DRX-inactivity timer duration 644) after a last resource when utilizing the scheme 600, a predefined X value for the X slots 702 after a last reserved resource when utilizing the scheme 700, or a predefined Y value for the Y slots 802 after a PSFCH resource associated with a last reserved resource when utilizing the scheme 800. Additionally or alternatively, the DRX information may include a DRX-retransmission timer value (e.g., the DRX-retransmission timer duration 524) and/or a DRX-retransmission start time (e.g., N slots 532) prior to a reserved resource. Additionally or alternatively, the DRX information may include a DRX-HARQ-RTT timer value (e.g., the DRX-HARQ-RTT timer duration 522). Additionally or alternatively, the DRX information may include an indication of the second DRX pattern. Additionally or alternatively, the DRX information may include an indication of an ID associated with the sidelink transmitting UE 402b that transmits over the second sidelink 406. Additionally or alternatively, the DRX information include a configuration of a PSFCH resource pool (where the sidelink receiving UE 402c may transmit HARQ ACK-NACK feedbacks for data received over the second sidelink 406) and/or an association between a PSFCH resource and a PSSCH resource. In some examples, a PSFCH resource for a PSSCH resource may be located at a certain number of slots after the PSSCH resource.

At action 925, the sidelink receiving UE 402c may start to operate in a DRX mode for communication over the first sidelink 404 according to the first DRX pattern. The sidelink receiving UE 402c may also start to operate in a DRX mode for communication over the second sidelink 406 according to the second DRX pattern. The sidelink receiving UE 402c may start to operate in the DRX mode for the first sidelink 404 and the second sidelink 406 in any suitable order. For instance, the sidelink receiving UE 402c may start to operate in the DRX mode for the first sidelink 404 before starting to operate in the DRX mode for the second sidelink 406. Alternatively, the sidelink receiving UE 402c may start to operate in the DRX mode for the first sidelink 404 after starting to operate in the second sidelink 406. In some instances, the sidelink receiving UE 402c may utilize one or more timers to track and maintain (the DRX on-durations and/or DRX off-durations of) the first DRX pattern and (the DRX on-durations and/or DRX off-durations) of the second DRX pattern. The sidelink receiving UE 402c may switch from an inactive state to an active state at the start of a DRX on-duration and may switch from the active state to the inactive state at the end of the DRX on-duration. In some instances, the sidelink receiving UE 402c can remain in the active state at the end of the DRX on-duration if the DRX on-duration ends within a DRX on-duration of another sidelink. That is, the sidelink receiving UE 402c can remain in the active state based on a union of DRX on-durations from different connected sidelinks.

At action 930, during a DRX on-duration 902 of the second DRX pattern, the sidelink transmitting UE 402b transmits, and the sidelink receiving UE 402c receives, a first communication signal over the second sidelink 406. The first communication signal may include SCI and data. The SCI may include SCI-1 (e.g., in a PSCCH of a sidelink resource) and/or SCI-2 (e.g., in a PSSCH of the sidelink resource). The SCI-1 may indicate one or more sidelink reservations for future sidelink resources (e.g., within 32 upcoming sidelink slots). For example, the SCI-1 may include a time domain reservation field indicating the reserved sidelink resources (e.g., time resources). Additionally, the SCI-1 may indicate a source ID identifying the sidelink transmitting UE 402b as a transmitter source and a destination ID identifying the sidelink receiving UE 402c as a target receiver. The SCI-2 may indicate transmission parameters (e.g., MCS) and/or an allocated resource (e.g., symbol(s) and/or subcarrier(s) in a sidelink slot) used for transmitting the data (e.g., in the PSSCH). In some aspects, the sidelink receiving UE 402c may perform SCI sensing and decoding on the first communication signal and may successfully decode the SCI from the first communication signal and determine that SCI is destined to the sidelink receiving UE 402c based on the destination ID indicated by the SCI. The sidelink receiving UE 402c may further perform data decoding on the first communication signal based on the resource allocation and/or transmission parameters indicated by the SCI.

At action 935, the sidelink receiving UE 402c starts a DRX-inactivity timer in response to detecting the SCI destined to the sidelink receiving UE 402c. The sidelink receiving UE 402c may configure a timer duration for the DRX-inactivity timer according to the selected DRX-inactivity timer configuration mechanism. For instance, if the sidelink receiving UE 402c utilizes the scheme 600 discussed above with reference to FIG. 6, the sidelink receiving UE 402c may configure the DRX-inactivity timer with a duration covering a next reserved sidelink resource indicated by the SCI (if a current sidelink resource is not a last reserved resource) or with a predefined timer value (if a current sidelink resource where the SCI is detected is a last reserved resource). In other instances, if the sidelink receiving UE 402c utilizes the scheme 700 discussed above with reference to FIG. 7, the sidelink receiving UE 402c may configure the DRX-inactivity timer with a duration covering X slots 702 after a last reserved sidelink resource reserved indicated by the SCI. In some further instances, if the sidelink receiving UE 402c utilizes the scheme 800 discussed above with reference to FIG. 8, the sidelink receiving UE 402c may configure the DRX-inactivity timer with a duration covering Y slots 802 after a PSFCH resource associated with a last reserved sidelink resource indicated by the SCI.

As an example, the sidelink receiving UE 402c may remain in an active state beyond the DRX on-duration 902 shown by the extended DRX on-duration 904 based on the DRX-inactivity timer is in progress or active at the end of the DRX on-duration 902.

In some aspects, the sidelink transmitting UE 402b and the sidelink receiving UE 402c may utilize HARQ techniques for communication. For instance, the sidelink receiving UE 402c may fail to decode the data from the received first communication signal. Thus, at action 940, the sidelink receiving UE 402c transmits, and the sidelink transmitting UE 402b receives over the second sidelink 406, a HARQ NACK feedback for the data (carried by the first communication signal).

At action 950, the sidelink receiving UE 402c starts a DRX-retransmission timer N slots prior to a next reserved sidelink resource indicated by the SCI. The sidelink receiving UE 402c may configure a timer duration for the DRX-retransmission timer based on a DRX-retransmission timer value (e.g., indicated by the DRX information at action 920). In some aspects, the DRX-retransmission timer value can be configured by an upper layer (e.g., an RRC layer) at the sidelink receiving UE 402c. The sidelink receiving UE 402c may continue to stay in the active state as shown by the extended DRX on-duration 904 based on the DRX-retransmission timer is in progress or active.

At action 960, the sidelink transmitting UE 402a monitors for SCI and/or NACK communicated over the second sidelink 406 to determine whether the sidelink receiving UE 402c extends a DRX on-duration. For instance, the sidelink transmitting UE 402a may receive a signal from the channel and may perform blind SCI decoding on the received signal. Upon successfully decoding SCI from the received signal, the sidelink transmitting UE 402a may determine whether the SCI (e.g., including SCI-1 and SCI-2) and associated data is intended for the sidelink receiving UE 402c, for example, by determining whether the destination ID indicated by the SCI matches an ID that identifies the sidelink receiving UE 402c. Further, the sidelink transmitting UE 402a may determine whether the SCI is associated with the second sidelink 406, for example, by determining whether a source ID indicated by the SCI matches an ID that identifies the sidelink transmitting UE 402b.

As an example, the sidelink transmitting UE 402a detected SCI including a destination ID matching the ID of the sidelink receiving UE 402c, and a source ID matching the ID of the sidelink transmitting UE 402b. Thus, at action 965, the sidelink transmitting UE 402a determines an extended DRX on-duration at the sidelink receiving UE 402c in response to the detected SCI. For instance, the sidelink transmitting UE 402a may determine that the detected SCI is within a DRX on-duration of the second DRX pattern associated with the second sidelink 406. The sidelink transmitting UE 402a may determine when the sidelink receiving UE 402c may start a DRX-inactivity timer (based on a reception time of the SCI). The sidelink transmitting UE 402a may determine that the DRX-inactivity timer will trigger an extended DRX on-duration at the sidelink receiving UE 402c (for communications over the second sidelink 406) based on a reception time of the SCI with respect to a start or an end of a DRX on-duration of the second DRX pattern and/or a DRX-inactivity timer value or duration. In some aspects, the sidelink transmitting UE 402a may determine the length of extended DRX on-duration contributed by the DRX-inactivity timer based on the time domain reservation field (indicating reserved resources in upcoming sidelink slot) in the detected SCI.

As discussed above, the sidelink receiving UE 402c may configure the DRX-inactivity timer duration in various ways. For instance, if the sidelink receiving UE 402c utilizes the scheme 600 discussed above with reference to FIG. 6, the sidelink transmitting UE 402a may determine the extended DRX duration based on a next sidelink resource reserved by the SCI. In this regard, the sidelink receiving UE 402c may identify a next reserved sidelink resource based on a reservation indicated by the SCI and may determine that the DRX-inactivity timer duration will cover until at least the end of the next reserved sidelink resource. That is, the duration of the DRX-inactivity timer is dependent on the number of sidelink slots between the current resource (where the SCI is detected from) and the upcoming or next reserved resource (if a current sidelink resource is not a last reserved resource) or a predefined duration (if the current resource is a last reserved resource). Accordingly, the sidelink transmitting UE 402a may be aware that the sidelink receiving UE 402c will remain in an active state until the end of the next reserved sidelink resource. Referring to the example shown in FIG. 6, if the detected SCI corresponds to SCI 621, the sidelink transmitting UE 402a may schedule a transmission for the sidelink receiving UE 402c during a period that is outside of the on-duration 412 as long as the period is before time T4. After determining that the DRX-inactivity timer is activated at time T1, the sidelink transmitting UE 402a may continue to monitor for SCI (e.g., from the resource 622) to determine whether the sidelink receiving UE 402c will restart the DRX-inactivity timer for the next reserved resource 622. If the sidelink transmitting UE 402a detected SCI for destined to the sidelink receiving UE 402c in the resource 622, the sidelink receiving UE may determine that the sidelink receiving UE 402c further extends the DRX on-duration. Thus, the sidelink transmitting UE 402a may schedule a transmission during a period that is outside of the on-duration 412 as long as the period is before time T5. If, however, the sidelink transmitting UE 402a fails to detect SCI destined to the sidelink receiving UE 402c in the resource 622, the sidelink transmitting UE 402a may determine that the DRX-on duration is terminated if there is no DRX-retransmission timer active at the sidelink receiving UE 402c.

In some other instances, if the sidelink receiving UE 402c utilizes the scheme 700 discussed above with reference to FIG. 7, the sidelink transmitting UE 402a may determine the extended DRX duration based on a last sidelink resource reserved by the SCI and a time offset from the last reserved sidelink resource. In this regard, the sidelink receiving UE 402c may identify a last reserved sidelink resource based on a last reservation indicated by the SCI and may determine that the DRX-inactivity timer duration will cover until X slots 702 (the time offset) after the last reserved sidelink resource. Accordingly, the sidelink transmitting UE 402a may be aware that the sidelink receiving UE 402c will remain in an active state until X slots 702 after the last reserved sidelink resource. Referring to the example shown in FIG. 7, if the detected SCI corresponds to SCI 621, the sidelink transmitting UE 402a may schedule a transmission for the sidelink receiving UE 402c during a period that is outside of the on-duration 412 as long as the period is before time T6.

In some further instances, if the sidelink receiving UE 402c utilizes the scheme 800 discussed above with reference to FIG. 8, the sidelink transmitting UE 402a may determine the extended DRX duration based on based on a PSFCH resource associated with a last sidelink resource reserved b by the SCI and a time offset from after the PSFCH resource. In this regard, the sidelink receiving UE 402c may identify a last reserved resource based on a last reservation indicated by the SCI and may determine that the DRX-inactivity timer duration will cover until Y slots 802 (the time offset) after a PSFCH resource associated with the last reserved resource. Accordingly, the sidelink transmitting UE 402a may be aware that the sidelink receiving UE 402c will remain in an active state until Y slots 802 after a PSFCH resource associated with the last reserved resource. In some instances, the sidelink transmitting UE 402a may determine the PSFCH resource based on a PSFCH resource pool configuration and/or a predetermined association between a PSSCH resource and a corresponding PSFCH resource. Referring to the example shown in FIG. 8, if the detected SCI corresponds to SCI 621, the sidelink transmitting UE 402a may schedule a transmission for the sidelink receiving UE 402c during a period that is outside of the on-duration 412 as long as the period is before time T7.

In some aspects, the sidelink transmitting UE 402a may further detect the NACK feedback (transmitted by the sidelink receiving UE 402c over the second sidelink 406 at action 940) from the monitoring at action 960. To that end, the sidelink transmitting UE 402a may monitor for ACK/NACK in a PSFCH resource associated with the first communication signal. In some instances, the sidelink transmitting UE 402a may receive a configuration for a PSFCH resource pool (including one or more symbols in time and one or more subcarriers in frequency) used by the sidelink receiving UE 402c for the transmitting ACK/NACK for data received from the sidelink transmitting UE 402b. When the sidelink communications are over a licensed band, each sidelink data resource (PSSCH resource) may be associated with one PSFCH resource. When the sidelink communications are over an unlicensed band, each sidelink data resource (PSSCH resource) may be associated with multiple PSFCH resources or PSFCH opportunities since an LBT failure at the sidelink receiving UE may gate an ACK/NACK transmission. Accordingly, the sidelink transmitting UE 402a may monitor all PSFCH opportunities associated with the first communication signal. The ACK/NACK monitoring may include receiving a signal from the PSFCH resource and performing decoding on the received signal to determine whether an ACK or an ACK is carried in the received signal. An ACK indication may be represented by a certain bit value or a certain sequence, and an NACK indication may be represented by a different bit value or a different sequence.

The sidelink transmitting UE 402a may determine that the DRX on-duration 902 associated with the second sidelink 406 is further extended by the sidelink receiving UE 402c based on the detection of the NACK feedback. As explained above at action 950, the sidelink receiving UE 402c may start the DRX-retransmission timer N slots prior to a next reserved resource indicated by the SCI and may configure the DRX-retransmission timer with a timer duration corresponding to the DRX-retransmission timer value (indicated by the DRX information at action 920). Accordingly, the sidelink transmitting UE 402a may determine that sidelink receiving UE 402c had started a DRX-retransmission timer (after the sidelink receiving UE 402c transmitted the NACK feedback). The sidelink transmitting UE 402a may determine that the DRX-retransmission timer will further an extended DRX on-duration at the sidelink receiving UE 402c (for communications over the second sidelink 406) based on a transmission time of the NACK feedback and a DRX-retransmission timer value or duration (e.g., indicated by the DRX information at action 920). In other aspects, if the sidelink transmitting UE 402a detected an ACK feedback instead of a NACK feedback, the sidelink transmitting UE 402a may be aware that the sidelink receiving UE 402c may terminate the extended DRX-on duration when the DRX-retransmission timer expires.

At action 970, the sidelink transmitting UE 402a adjusts a transmission pattern for communicating over the first sidelink 404 with the sidelink receiving UE 402c based on the extended DRX on-duration at the sidelink receiving UE 402c (for communications over the second sidelink 406). For instance, the sidelink transmitting UE 402a may initially determine a transmission pattern for transmitting to the sidelink receiving UE 402c during DRX on-duration(s) of the first DRX pattern. However, based on information of the extended DRX duration at the sidelink receiving UE 402c, the UE 402a may schedule a transmission for the sidelink receiving UE 402c during a period outside of an on-duration of the first DRX pattern as long as the period is within the extended DRX duration of the sidelink receiving UE 402c. In other words, the sidelink transmitting UE 402a can dynamically adjust the transmission pattern for transmission over the first sidelink 404 based on information of extended DRX on-duration(s) (associated with the second sidelink 406) at the sidelink receiving UE 402c. For instance, the sidelink transmitting UE 402a may add a transmission on-duration corresponding to the extended DRX on-duration (during which the sidelink receiving UE 402c may be in an active state monitoring for transmission) into the transmission pattern and schedule a transmission to the sidelink receiving UE 402c within the added transmission on-duration.

At action 975, the sidelink transmitting UE 402a transmits, and the sidelink receiving UE 402c receives over the first sidelink 404, a second communication signal during the extended DRX on-duration 904 according to the adjusted transmission pattern. For instance, the sidelink transmitting UE 402a may transmit the second communication signal during a period outside of an on-duration of the first DRX pattern. The second communication signal may include SCI and data. The second communication signal may include SCI and data. The SCI may include SCI-1 (e.g., in a PSCCH of a sidelink resource) and/or SCI-2 (e.g., in a PSSCH of the sidelink resource). For instance, the SCI-1 may indicate one or more sidelink reservations for future sidelink resources (e.g., within 32 upcoming sidelink slots). The SCI-2 may indicate HARQ process ID, a new data indicator (NDI), a source ID identifying the sidelink transmitting UE 402a as a source transmitter, and a destination ID identifying the sidelink receiving UE 402c as a target receiver. The SCI-2 may further indicate transmission parameters (e.g., MCS) and/or an allocated resource (e.g., symbol(s) and/or subcarrier(s) in a sidelink slot) used for transmitting the data (e.g., in the PSSCH).

In some aspects, the sidelink receiving UE 402c may switch from an active state to an inactive state at the end of the extended DRX on-duration 904. For instance, the sidelink receiving UE 402c may configure one or more RF components and/or baseband components, for example, in the modem 1412 and/or the RF unit 1414 of FIG. 14, to a sleep state or low-power state. While FIG. 9 illustrates one first communication signal (from the sidelink transmitting UE 402b to the sidelink receiving UE 402c) in the DRX on-duration 902, one NACK feedback (from the sidelink receiving UE 402c to the sidelink transmitting UE 402b) and one second communication signal (from the sidelink transmitting UE 402a to the sidelink receiving UE 402c) during the extended DRX on-duration 904, a greater number of communications can be support during the DRX on-duration 902 and/or during the extended DRX on-duration 904.

In some further aspects, at action 945, the sidelink receiving UE 402c may optionally start a DRX-HARQ-RTT timer after transmitting the NACK feedback, for example, to save power as explained above. For instance, the sidelink receiving UE 402c may switch one or more RF components or baseband components, for example, in the modem 1412 and/or the RF unit 1414 of FIG. 14, to a sleep state or low-power state while the DRX-HARQ-RTT timer is in progress as discussed above with reference to FIG. 5. Accordingly, the sidelink transmitting UE 402a may further consider the duration (within the extended DRX on-duration 904) during which the DRX-HARQ-RTT timer at the sidelink receiving UE 402c is in progress when adjusting the transmission pattern at action 970. For instance, the sidelink transmitting UE 402a may avoid transmitting to the sidelink receiving UE 402c during the duration when the DRX-HARQ-RTT timer is in progress.

As can be seen in the method 900, the sidelink transmitting UE 402a may acquire information of the sidelink receiving UE 402c having an extended DRX on-duration based on SCI and/or NACK sensing and/or over other sidelinks. The sensing and/or decoding of SCI/NACKs over other sidelinks can cause overhead (e.g., processing resources, power) at the sidelink transmitting UE 402a. Furthermore, if the sidelink transmitting UE 402a also operates in a DRX mode (with DRX on-durations at certain time0, then SCI/NACK sensing may become opportunistic and best effort. Accordingly, it may be desirable for the sidelink receiving UE 402c to provide the sidelink transmitting UE 402a with assistance information, for example, indicating dynamically extended DRX on-duration as will be discussed below with reference to FIG. 10.

Figure 10:
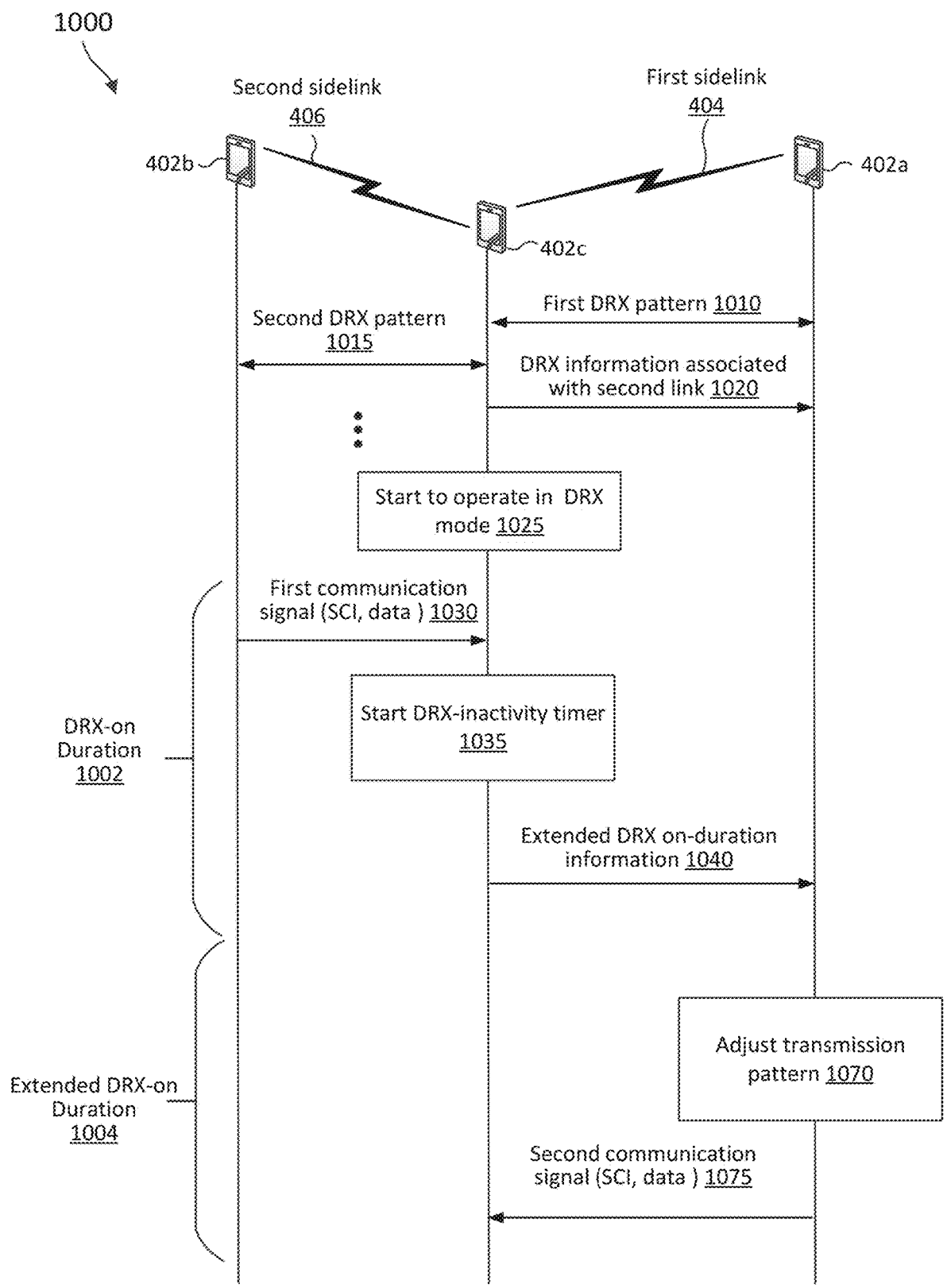
FIG. 10 is a sequence diagram illustrating a sidelink communication method that implements a dynamic transmission pattern based on DRX extended-on operations according to some aspects of the present disclosure.

FIG. 10 is a sequence diagram illustrating a sidelink communication method 1000 that implements a dynamic transmission pattern based on DRX extended-on operations according to some aspects of the present disclosure. The method 1000 may be implemented among the UE 402a, 402b, and 402c. The method 1000 is described with reference to the sidelink configuration shown in FIG. 4A. The method 1000 may utilize similar mechanisms as discussed above with respect to FIGS. 4B, 6, 7, and/or 8. In some aspects, the method 1000 may start after the sidelink receiving UE 402c had established a connection over a first sidelink 404 with the sidelink transmitting UE 402a and a connection over a second sidelink 406 with the sidelink receiving UE 402b as discussed above with reference to FIG. 4A. In some aspects, the UE 402a, 402b, 402c may utilize one or more components, such as the processor 1402, the memory 1404, the sidelink extended DRX-on module 1408, the transceiver 1410, the modem 1412, and the one or more antennas 1416 with reference to FIG. 14, to execute the actions of the method 1000. As illustrated, the method 1000 includes a number of enumerated actions, but aspects of the method 1000 may include additional action(s) before, after, and in between the enumerated action. In some aspects, one or more of the enumerated actions may be omitted or performed in a different order.

Generally speaking, the method 1000 includes features similar to method 900 in many respects. For example, actions 1010, 1015, 1020, 1025, 1030, 1035, 1070, and 1075 are similar to actions 910, 915, 920, 925, 930, 935, 970, and 975, respectively. Accordingly, for sake of brevity, details of those actions will not be repeated here and may be referred to the corresponding descriptions above. However, in the method 1000, the sidelink receiving UE 402c may provide the sidelink transmitting UE 402a with information (e.g., start time, end time, and/or duration) related to a dynamically extended DRX on-duration associated with the second sidelink 406. Alternatively, the sidelink receiving UE 402c may broadcast information (e.g., start time, end time, and/or duration) related to per-link extended DRX-on duration to assist peer sidelink transmitting UE 402 in communication with the sidelink receiving UE 402c.

For instance, at action 1010, the sidelink transmitting UE 402a exchanges a first DRX pattern with the sidelink receiving UE 402c for communications over the first sidelink 404, for example, using mechanism discussed above at action 910.

At action 1015, the sidelink transmitting UE 402b exchanges a second DRX pattern with the sidelink receiving UE 402c for communications over the second sidelink 406, for example, using mechanism discussed above at action 915.

At action 1020, the sidelink receiving UE 402c transmits, and the sidelink transmitting UE 402a receives, DRX information associated with the second sidelink 406. The DRX information including similar information such as DRX-inactivity timer configuration mechanism (e.g., the scheme 600, 700, or 800), a predefined duration value (e.g., the DRX-inactivity timer duration 644) when utilizing the scheme 600, a predefined X value for the X slots 702 when utilizing the scheme 700a, a predefined Y value for the Y slots 802 when utilizing the scheme 800, a DRX-retransmission timer value (e.g., the DRX-retransmission timer duration 524), a DRX-HARQ-RTT timer value (e.g., the DRX-HARQ-RTT timer duration 522), an ID associated with the sidelink transmitting UE 402b associated with the second sidelink 406, a PSFCH resource pool configuration for the second sidelink 406, and/or an association between a PSFCH resource and a corresponding PSSCH resource for the second sidelink 406 as discussed above at action 920.

At action 1025, the sidelink receiving UE 402c may start to operate in a DRX mode for communication over the first sidelink 404 according to the first DRX pattern. The sidelink receiving UE 402c may also start to operate in a DRX mode for communication over the second sidelink 406 according to the second DRX pattern. The sidelink receiving UE 402c may utilize one or more timers to track and maintain (the DRX on-durations and/or DRX off-durations of) the first DRX pattern and (the DRX on-durations and/or DRX off-durations) of the second DRX pattern, for example, using mechanism as discussed above at action 925.

At action 1030, during a DRX on-duration 1002 of the second DRX pattern, the sidelink transmitting UE 402b transmits, and the sidelink receiving UE 402c receives, a first communication signal over the second sidelink 406. The first communication signal may include SCI and data. In some aspects, the sidelink receiving UE 402c may perform SCI sensing and decoding on the first communication signal and may successfully decode the SCI from the first communication signal and determine that SCI is destined to the sidelink receiving UE 402c as discussed above at action 1030. The sidelink receiving UE 402c may decode data from the first communication in response to detecting the SCI destined to the sidelink receiving UE 402c.

At action 1035, the sidelink receiving UE 402c starts a DRX-inactivity timer in response to detecting the SCI destined to the sidelink receiving UE 402c. The sidelink receiving UE 402c may start the DRX-inactivity timer using the scheme 600, 700, or 800 as discussed above with reference to FIG. 6, 7, or 8, respectively, and at action 935 of the method 900. The sidelink receiving UE 402c may remain in an active state beyond the DRX on-duration 1002 shown by the extended DRX on-duration 1004 based on the DRX-inactivity timer is in progress or active at the end of the DRX on-duration 1002.

At action 1040, the sidelink receiving UE 402c transmits, and the sidelink transmitting UE 402a receives, extended DRX on-duration information over the first sidelink 404. For instance, the sidelink receiving UE 402c may indicate a starting time, a duration, and/or an end time of an extended DRX on-duration at the sidelink receiving UE 402c. The extended DRX on-duration may be extended from a DRX on-duration of the second DRX pattern based on the DRX-inactivity timer started at action 1035. In some instances, the extended DRX on-duration may be further extended from the DRX on-duration based on a DRX-retransmission timer as discussed above with reference to FIG. 5 and at action 950 of the method 900. Additionally, the sidelink receiving UE 402c may utilize a DRX-HARQ-RTT timer to stop monitoring for SCI or any sidelink transmission for a period of time as discussed above with reference to FIG. 5 and at action 945 of the method 900. Accordingly, the extended DRX on-duration information may include an indication of the period during which the DRX-HARQ-RTT timer is active so that the sidelink transmitting UE 402a may not schedule a transmission during that period.

In some aspects, the sidelink receiving UE 402c may indicate the extended DRX on-duration information via broadcast signaling. For instance, the sidelink receiving UE 402c may include in a broadcast message, a duration of the extended DRX on-duration 1004, a start time of the extended DRX on-duration 1004, an end time of the extended DRX on-duration 1004, a silent period (no SCI sensing or decoding during a DRX-HARQ-RTT timer duration) within the extended DRX on-duration 1004, a DRX pattern (e.g., the second DRX pattern), and/or an ID identifying a sidelink transmitting UE for the second sidelink 406. In general, the sidelink receiving UE 402c may broadcast can include similar extended DRX on-duration information for each connected sidelink associated with the sidelink receiving UE 402c. Accordingly, the sidelink transmitting UE 402a may receive extended DRX on-duration information for each sidelink with the sidelink receiving UE 402c as a receiver and may schedule a transmission for the sidelink receiving UE 402c during an extended DRX on-duration of any of the sidelinks (with the sidelink receiving UE as a receiver). In some instances, the sidelink receiving UE 402c may transmit the broadcast extended DRX on-duration information as part of SCI-2. In other instances, the sidelink receiving UE 402c may transmit the broadcasted extended DRX on-duration information as part of data in a PSSCH.

In some other aspects, the sidelink receiving UE 402c may indicate the extended DRX on-duration information via unicast signaling. For instance, the sidelink receiving UE 402c may transmit the extended DRX on-duration information along ("piggyback") with a HARQ ACK/NACK feedback (e.g., for data received from the sidelink transmitting UE 402a in a previous communication) as a unicast message to the sidelink transmitting UE 402a in a PSFCH resource. If the sidelink receiving UE 402c has multiple connected sidelinks, the sidelink receiving UE 402c can include per-link extended DRX on-duration information for each sidelink in the unicast message. The unicast message may include similar information as the broadcast message discussed above, for example, including, a duration of the extended DRX on-duration 1004, a start time of the extended DRX on-duration 1004, an end time of the extended DRX on-duration 1004, a silent period (no SCI sensing or decoding during a DRX-HARQ-RTT timer duration) within the extended DRX on-duration 1004, a DRX pattern, and/or an ID of a sidelink transmitting UE for each connected sidelink. Accordingly, the sidelink transmitting UE 402a may receive extended DRX on-duration information for each sidelink with the sidelink receiving UE 402c as a receiver and may schedule a transmission for the sidelink receiving UE 402c during an extended DRX on-duration of any of the sidelinks (with the sidelink receiving UE as a receiver).

At action 1070, the sidelink transmitting UE 402a adjusts a transmission pattern for communicating over the first sidelink 404 with the sidelink receiving UE 402c based on the extended DRX on-duration information received from the sidelink receiving UE 402c. For instance, the sidelink transmitting UE 402a may schedule a transmission for the sidelink receiving UE 402c during a period outside of an on-duration of the first DRX pattern, but within the extended DRX duration of the sidelink receiving UE 402c.

At action 1075, the sidelink transmitting UE 402a transmits, and the sidelink receiving UE 402c receives over the first sidelink 404, a second communication signal during the extended DRX on-duration 1004 according to the adjusted transmission pattern. The second communication signal may include SCI and data. In some instances, the sidelink transmitting UE 402a may transmit the second communication signal during a period outside of an on-duration of the first DRX pattern.

In some aspects, the sidelink receiving UE 402c may switch from an active state to an inactive state at the end of the extended DRX on-duration 904. For instance, the sidelink receiving UE 402c may configure one or more RF components and/or baseband components, for example, in the modem 1412 and/or the RF unit 1414 of FIG. 14, to a sleep state or low-power state. While FIG. 10 illustrates one first communication signal (from the sidelink transmitting UE 402b to the sidelink receiving UE 402c) in the DRX on-duration 1002 and one second communication signal (from the sidelink transmitting UE 402a to the sidelink receiving UE 402c) during the extended DRX on-duration 1004, a greater number of communications can be support during the DRX on-duration 1002 and/or during the extended DRX on-duration 1004.

In some aspects, the UEs 402a, 402b, 402c may use a combination of the method 900 and method 1000 to utilize extended DRX on-durations at the UE 402c. For example, during some periods, the sidelink transmitting UE 402a may monitor for SCI and/or NACK over another sidelink (e.g., the sidelink 406) associated with the sidelink receiving UE 402c, determine an extended DRX on-duration at the sidelink receiving UE 402c based on the SCI and/or NACK monitoring, and schedule a transmission for the sidelink receiving UE 402c over the first sidelink 404 during the extended DRX on-duration. During other periods, the sidelink receiving UE 402c may transmit, the sidelink transmitting UE 402a may receive, an indication of an extended DRX on-duration at the sidelink receiving UE 402c, and schedule a transmission for the sidelink receiving UE 402c over the first sidelink 404 during the extended DRX on-duration.

In some aspects, if a DRX on-duration of the first DRX pattern (e.g., configured by an RRC configuration) for the first sidelink 404 overlaps with a DRX on-duration of the second DRX pattern for the second sidelink 406, the sidelink transmitting UE 402a may adjust the transmission pattern based on a union of the DRX on-duration of first DRX pattern and the DRX on-duration of the second DRX pattern. For example, the sidelink transmitting UE 402a may receive information about the second DRX pattern at action 920 of the method 900 or at action 1020 of the method 1000. In some aspects, the sidelink transmitting UE 402a may obtain information related to an extended DRX on-duration (e.g., the extended DRX on-durations 514, 610, 710, 810, 904, and/or 1004) based on SCI and/or NACK sensing and/or based on extended DRX on-duration information received from the sidelink receiving UE 402c, the sidelink transmitting UE 402a may dynamically adjust the transmission pattern by adding the extended DRX on-duration to the transmission pattern.

Figure 11:
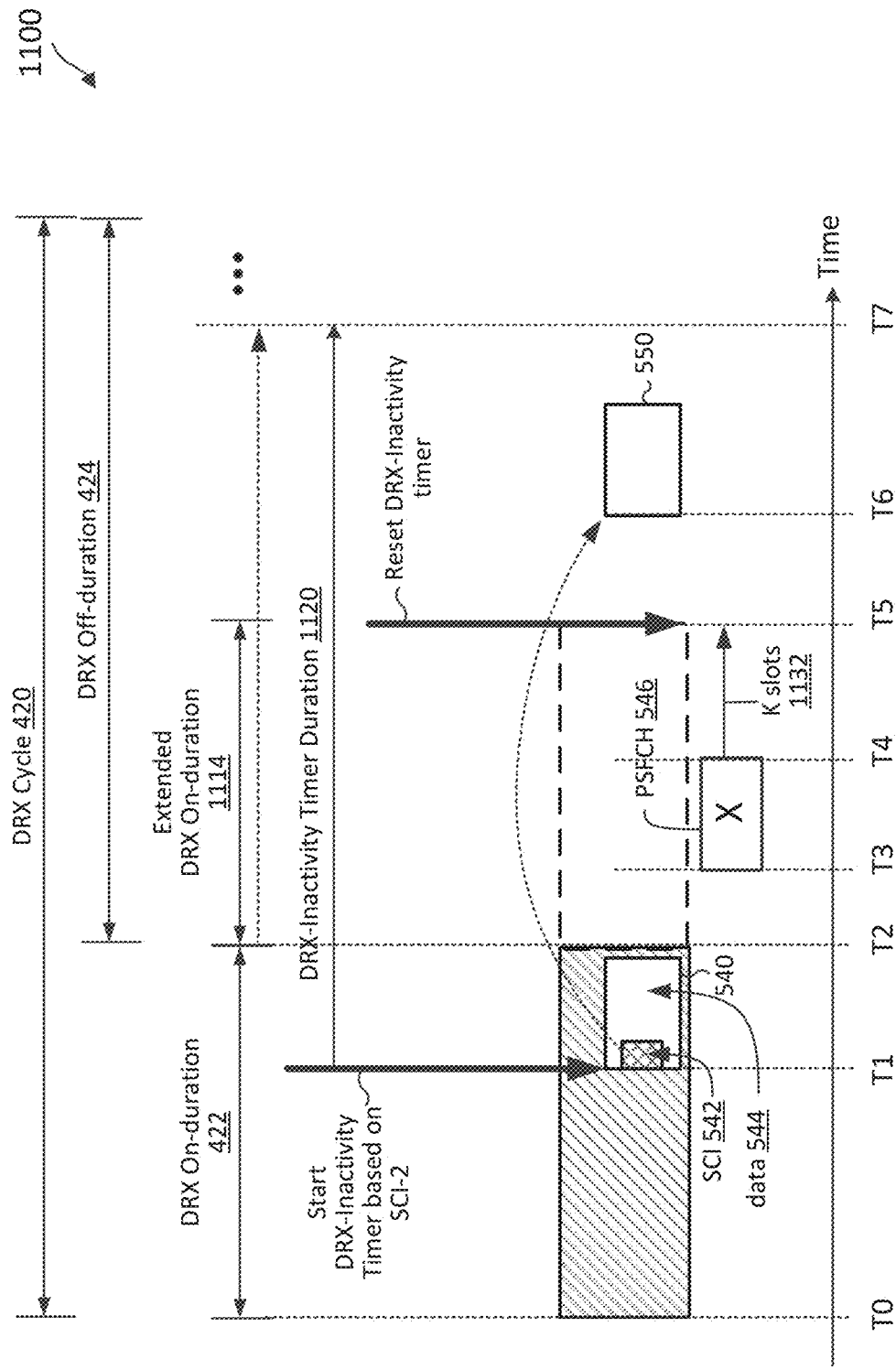
FIG. 11 illustrates a sidelink DRX extended-on configuration scheme according to some aspects of the present disclosure.

FIG. 11 illustrates a sidelink DRX extended-on configuration scheme 1100 according to some aspects of the present disclosure. The scheme 1100 may be employed by UEs such as the UEs 115, 302, and 402. In particular, a sidelink UE may extend a DRX on-duration and terminate the extended DRX on-duration early based on a mismatched destination ID as shown in the scheme 1100. In FIG. 11, the x-axis represents time in some arbitrary units. The scheme 1100 is described using a similar communication scenario as the scenario 500 discussed above with reference to FIG. 5, where the sidelink receiving UE 402c operates in a DRX mode according to a DRX cycle 420 including a DRX-on duration 422 followed by a DRX off-duration 424. For simplicity, FIG. 11 may use the same reference numerals as in FIGS. 4-5.

As shown, at time T1, the sidelink receiving UE 402c receives SCI 542 from a sidelink resource 540. As explained above, the SCI 542 can include SCI-1 and SCI-2, and the SCI-1 may indicate one or more reservations for future sidelink resources (e.g., within 32 upcoming sidelink slots). As an example, the SCI-1 of SCI 542 includes a reservation for a sidelink resource 550 at time T6 as shown by the dotted arrow, and the SCI-2 of SCI 542 may include a truncated destination ID. The truncated destination ID may be referred to as a L1 ID. The L1 ID is a shortened version of a full logical ID (e.g., a media access control (MAC) ID). For example, the L1 ID may include a portion of the full logical ID or MAC ID. The sidelink receiving UE 402c may determine whether the SCI 542 is destined to the sidelink receiving UE 402c by comparing the truncated destination ID with a MAC ID of the sidelink receiving UE 402c. The sidelink receiving UE 402c may determine that the SCI 542 is destined to the sidelink receiving UE 402c when the truncated destination ID in the SCI-2 matches a portion of the MAC ID of the sidelink receiving UE 402c. In response to determining that the SCI 542 is destined to the sidelink receiving UE 402c, the sidelink receiving UE 402c may decode the data 544 from the sidelink resource 540, for example, based on transmission parameters (e.g., MCS) and/or resource information (e.g., time and frequency locations of the data 544 in the resource 540) indicated by the SCI 542. Additionally, the sidelink receiving UE 402c may start a DRX-inactivity timer upon detecting the SCI 542 destined to the UE 402c as shown by the arrow at time T1. The sidelink receiving UE 402c may configure the DRX-inactivity timer with a DRX-inactivity timer duration 1120, for example, according to the scheme 600, 700, or 800 as discussed above with reference to FIG. 6, 7, or 8, respectively. As an example, the DRX-inactivity timer duration 1120 may end at time T7. At the end of the DRX on-duration 422, the sidelink receiving UE 402c may extend the DRX on-duration since the DRX-inactivity timer is in progress. The DRX on-duration can be extended from time T2 to time T7 (shown by the dashed arrow) based on the DRX-inactivity timer.

The data 544 (e.g., PSSCH payload) may include a full logical ID or full destination ID, which may be referred to as a layer 2 (L2) ID. The sidelink receiving UE 402c may further compare the full destination ID in the data 544 with the MAC ID of the sidelink receiving UE 402c to determine whether the data 544 is intended for the sidelink receiving UE 402c. Since the L1 ID is a truncated destination ID, there is a probability that the L1 ID in the SCI 542 matches a portion of the sidelink receiving UE 402's MAC ID, but the full destination ID in the data 544 does not completely match the sidelink receiving UE 402's MAC ID. Upon detecting a mismatch between the full destination ID in the data 544 and the sidelink receiving UE 402's MAC ID, the sidelink receiving UE 402c may refrain from transmitting a HARQ ACK/NACK feedback as shown by the cross symbol "X" in the PSFCH resource 546 associated with the sidelink resource 540. Further, in response to determining the full destination ID in the data 544 failing to match the sidelink receiving UE 402's MAC ID, the sidelink receiving UE 402c may terminate the DRX-inactivity timer K slots 1132 after the PSFCH resource 546 as shown by the arrow at time T5. That is, the sidelink receiving UE 402c may reset the DRX-inactivity timer K slots 1132 after the PSFCH resource 546 instead of waiting for the DRX-inactivity timer to expires. Since the DRX-inactivity timer is terminated at time T5, the extended DRX on-duration also terminates at time T5, resulting in a shorter extended DRX on-duration 1114. In some aspects, the value K for the K slots 1132 can be preconfigured (e.g., by an RRC configuration from a BS 105 or a peer sidelink transmitting UE 115 or 402).

In some aspects, a peer sidelink transmitting UE (e.g., the sidelink transmitting UE 402a) connected to the sidelink receiving UE 402c via another sidelink (e.g., the first sidelink 404) may be aware that the sidelink receiving UE 402c will extend a DRX on-duration to the time T7, for example, based on SCI sensing as discussed above with reference to FIG. 9 and/or assistance information received from the sidelink receiving UE 402c as discussed above with reference to FIG. 10. The sidelink transmitting UE 402a may monitor for HARQ ACK/NACK in the PSFCH resource 546 associated with the sidelink resource 540. In some aspects, the sidelink transmitting UE 402a may obtain information about the location of the PSFCH resource 546 based on a PSFCH resource pool configuration (e.g., provided by the sidelink receiving UE 402c).

When the sidelink receiving UE 402c and the sidelink transmitting UE 402a operate over a licensed band, the sidelink transmitting UE 402a may determine that the sidelink receiving UE 402c will terminate the extended DRX on-duration early upon failing to detect a HARQ ACK/NACK from the sidelink receiving UE 402c in the PSFCH resource 546. In some aspects, the sidelink transmitting UE 402a may have information associated with the value K, and thus may have information that the sidelink receiving UE 402c will terminate the extended DRX on-duration K slots after the PSFCH resource 546 at time T5. Upon detecting the early termination, the sidelink transmitting UE 402a may adjust its transmission pattern accordingly, for example, by refraining from scheduling a transmission for the sidelink receiving UE 402c outside of the extended DRX on-duration 1114.

Figure 12:
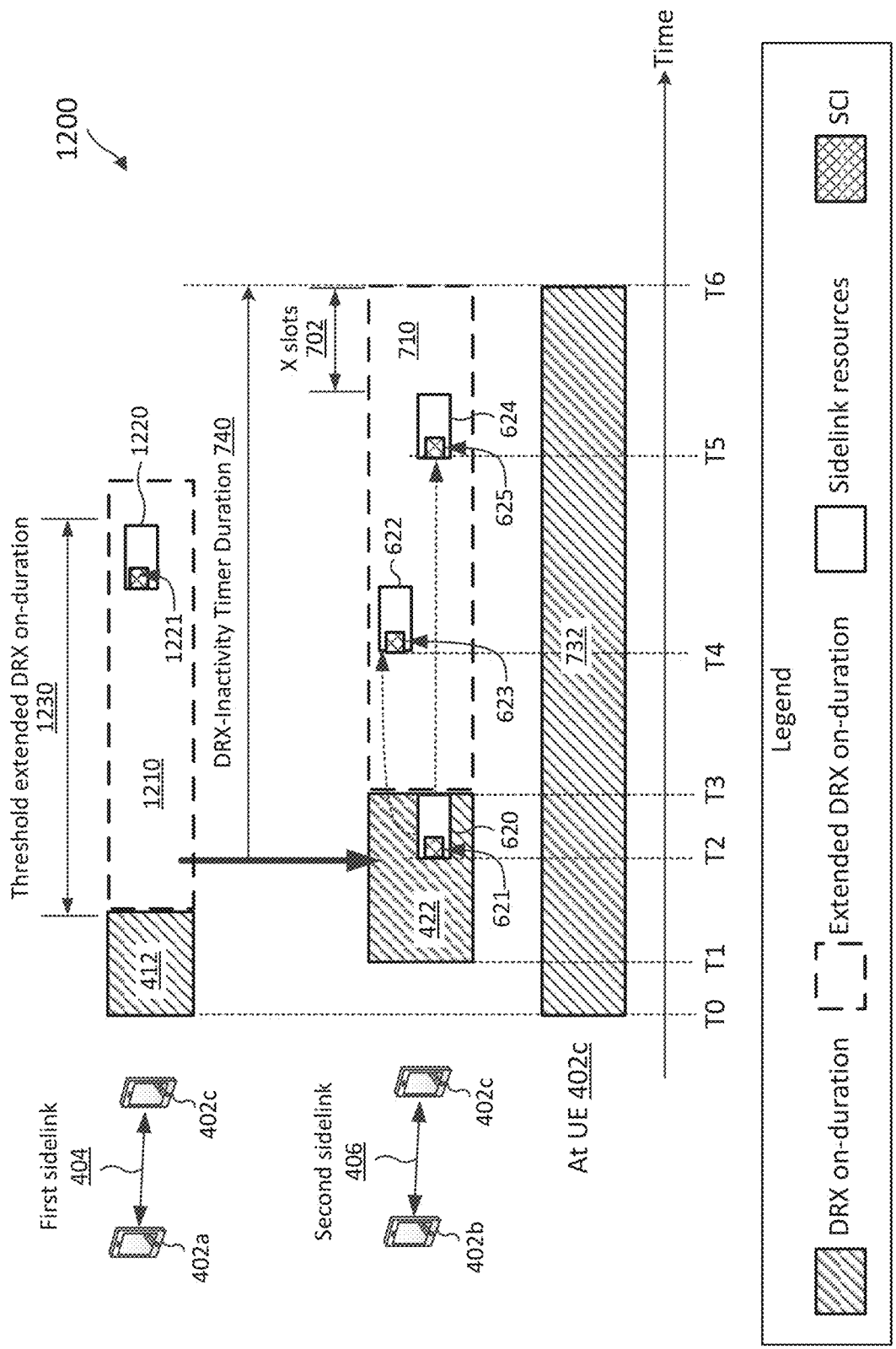
FIG. 12 illustrates a sidelink DRX extended-on configuration scheme according to some aspects of the present disclosure.

FIG. 12 illustrates a sidelink DRX extended-on configuration scheme 1200 according to some aspects of the present disclosure. The scheme 1200 may be employed by UEs such as the UEs 115, 302, and 402. In particular, a sidelink receiving UE may apply a threshold to limit the duration of an extend DRX on-duration as shown in the scheme 1200. In FIG. 12, the x-axis represents time in some arbitrary units. The scheme 1200 is described using the same sidelink communication configuration as shown in FIG. 4A and the same DRX extended-on scenario over the second sidelink 406 as shown in FIG. 7, and may use the same reference numerals as in FIGS. 4A and 7 for simplicity's sake.

In the scheme 1200, the sidelink transmitting UE 402a may detect that the sidelink receiving UE 402c has an extended DRX on-duration 710 for the second sidelink 406, for example, based on SCI sensing as discussed above with reference to FIG. 9 and/or assistance information received from the sidelink receiving UE 402c as discussed above with reference to FIG. 10. The sidelink transmitting UE 402a may determine to schedule a transmission for the sidelink receiving UE 402c during the extended DRX on-duration 710, for example, in a resource 1220 at time T4-1. As shown, the sidelink transmitting UE 402a transmits, and the sidelink receiving UE 402c receives over the first sidelink 404, SCI 1221 in the resource 1220. The SCI 1221 may include a destination ID identifying the sidelink receiving UE 402c as the target receiver. The sidelink receiving UE 402c may start a DRX-inactivity timer for the first sidelink 404 upon detecting the SCI 1221 destined to the sidelink receiving UE 402c. Since an active DRX-inactivity timer can cause the sidelink receiving UE 402c to remain in an active state, the sidelink receiving UE 402c can potentially further extend a DRX on-duration indefinitely when a sidelink transmitting UE from one sidelink utilizes an extended DRX on-duration of another sidelink for transmission. Thus, in the scheme 1200, the sidelink receiving UE 402c may limit the duration of an extended DRX on-duration for each sidelink to avoid extending DRX on indefinitely, which may then defeat the purpose of DRX for power saving. In the illustrated example of FIG. 12, the sidelink receiving UE 402c may extend the DRX on-duration 412 of the first sidelink 404 by an extended DRX on-duration 1210 not exceeding a threshold extended DRX on-duration 1230. For instance, the sidelink receiving UE 402c may start a DRX-inactivity timer based on detecting the SCI 1221, but may limit a timer duration of the DRX-inactivity so that the extended DRX on-duration 1210 may satisfy the threshold extended DRX on-duration 1230. Similarly, the sidelink receiving UE 402c may apply the same threshold extended DRX on-duration 1230 to the extended DRX on-duration 710 for the second sidelink 406.

In other aspects, the sidelink receiving UE 402c may refrain from starting a DRX-inactivity timer for the SCI 1221 received over the first sidelink 404 based on the SCI 1221 being received during the extended DRX duration 710 of the second sidelink 406. Similarly, while not shown, the sidelink receiving UE 402c may refrain from starting a DRX-retransmission timer when it fails to decode data of the first sidelink 404 received during an extended DRX on-duration of the second sidelink. That is, the sidelink receiving UE 402c may not start or restart a DRX-inactivity timer or a DRX-transmission timer. In this way, the sidelink receiving UE 402c can avoid further extending DRX on operations indefinitely.

In some aspects, the sidelink receiving UE 402c may determine, based on a certain rule, whether to limit DRX extended-on by restricting an extended DRX on-duration to be below a threshold (e.g., the extended DRX on-duration 1230) or refrain from starting a DRX-inactivity timer for a transmission received over a current sidelink when the transmission is not received within an extended DRX on-duration of the current sidelink. In some aspects, the sidelink receiving UE 402c may indicate to a peer sidelink transmitting UE whether the sidelink receiving UE 402c may set a limit to a duration of an extended DRX on-duration and/or whether the sidelink receiving UE 402c may start a DRX-inactivity timer for a current link if a transmission is not received within a DRX on-duration or an extended DRX on-duration of the current sidelink.

In some aspects, a sidelink UE may use any suitable combination of the schemes 600-800 and/or 1100-1200 discussed above with reference to FIGS. 6-8 and/or 11-12, respectively and/or the methods 900-1000 discussed above with reference to FIGS. 9-10 for extended DRX on operations and dynamic transmission pattern adjustments. For instance, a sidelink receiving UE (e.g., the UE 402*c*) may implement the method 900 or 1000 and apply the scheme 600, 700, or 800 at action 935 of the method 900 or at action 1035 of the method 1000. Further, the sidelink receiving UE and/or the sidelink transmitting UE may determine an early termination for an extended DRX on-duration using the scheme 1100 and/or limit a duration for extended DRX on operations using the scheme 1200.

Figure 13:
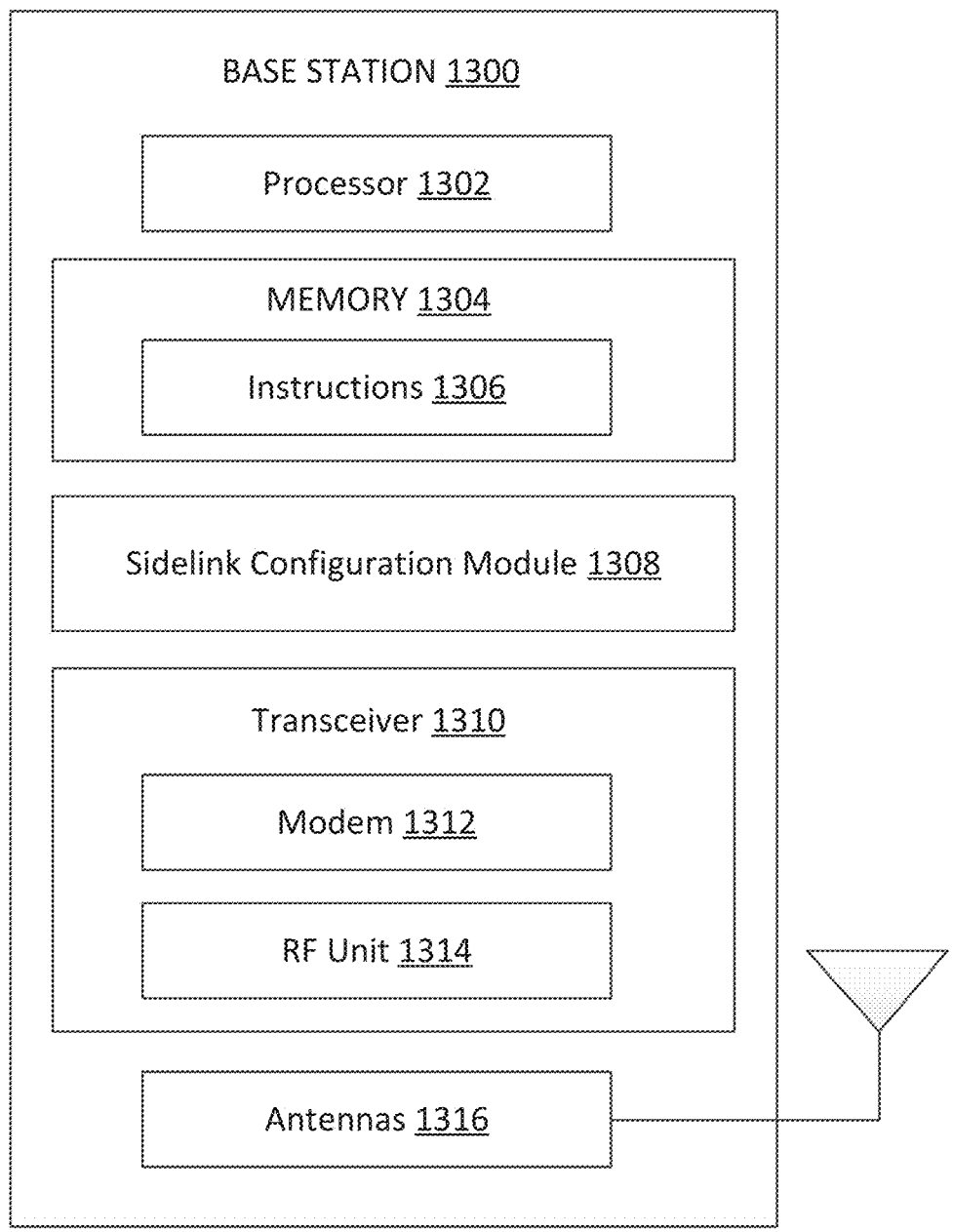
FIG. 13 illustrates a block diagram of a base station (BS) according to some aspects of the present disclosure.

FIG. 13 is a block diagram of an exemplary BS 1300 according to some aspects of the present disclosure. The BS 1300 may be a BS 105 as discussed in FIGS. 1-3, 4A-4B, and 9-10. As shown, the BS 1300 may include a processor 1302, a memory 1304, a sidelink configuration module 1308, a transceiver 1310 including a modem subsystem 1312 and a RF unit 1314, and one or more antennas 1316. These elements may be coupled with one another. The term "coupled" may refer to directly or indirectly coupled or connected to one or more intervening elements. For instance, these elements may be in direct or indirect communication with each other, for example via one or more buses.

The processor 1302 may have various features as a specific-type processor. For example, these may include a CPU, a DSP, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1304 may include a non-transitory computer-readable medium. The memory 1304 may store instructions 1306. The instructions 1306 may include instructions that, when executed by the processor 1302, cause the processor 1302 to perform operations described herein, for example aspects of FIGS. 1-3, 4A-4B, and 9-10. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink configuration module 1308 may be implemented via hardware, software, or combinations thereof. For example, the sidelink configuration module 1308 may be implemented as a processor, circuit, and/or instructions 1306 stored in the memory 1304 and executed by the processor 1302. In some examples, the sidelink configuration module 1308 can be integrated within the modem subsystem 1312. For example, the sidelink configuration module 1308 can be implemented by a combination of software components (e.g., executed by a DSP or a general processor) and hardware components (e.g., logic gates and circuitry) within the modem subsystem 1312.

The sidelink configuration module 1308 may communicate with one or more components of the BS 1300 to perform for various aspects of the present disclosure, for example, aspects of FIGS. 1-3, 4A-4B, and 9-10. The sidelink configuration module 1308 is configured to configure a UE (e.g., the UEs 115, 302, 402) with a sidelink configuration (e.g., a sidelink resource pool) for sidelink communications and/or a sidelink DRX configuration while the UE is in a coverage of the BS 1300. The sidelink DRX configuration may include a DRX cycle for sidelink communications, a DRX-inactivity timer configuration mechanism (e.g., based on the scheme 600, 700, or 800 discussed above with reference to FIGS., 6, 7, or 8, respectively), preconfigured timer values associated with a DRX-inactivity timer (e.g., the DRX-inactivity timer duration 644, the X slots 702, the Y slots 802), a DRX-HARQ-RTT timer (e.g., the DRX-HARQ-RTT timer duration 522), and/or a DRX-retransmission timer (e.g., the N slots 532, the DRX-retransmission timer duration 524, and/or the threshold extended DRX on-duration.

As shown, the transceiver 1310 may include the modem subsystem 1312 and the RF unit 1314. The transceiver 1310 can be configured to communicate bi-directionally with other devices, such as the UEs 115, 302, 402, and/or BS 1300 and/or another core network element. The modem subsystem 1312 may be configured to modulate and/or encode data according to a MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., RRC configurations, sidelink resource pool configuration, sidelink DRX configuration, etc.) from the modem subsystem 1312 (on outbound transmissions) or of transmissions originating from another source such as a UE 115, 302, 402, and/or UE 1400. The RF unit 1314 may be further configured to perform analog beamforming in conjunction with the digital beamforming. Although shown as integrated together in transceiver 1310, the modem subsystem 1312 and/or the RF unit 1314 may be separate devices that are coupled together at the BS 1300 to enable the BS 1300 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices and provide the received data messages for processing and/or demodulation at the transceiver 1310. The transceiver 1310 may provide the demodulated and decoded data to the sidelink configuration module 1308 for processing. The antennas 1316 may include multiple antennas of similar or different designs in order to sustain multiple transmission links.

In an aspect, the BS 1300 can include multiple transceivers 1310 implementing different RATs (e.g., NR and LTE). In an aspect, the BS 1300 can include a single transceiver 1310 implementing multiple RATs (e.g., NR and LTE). In an aspect, the transceiver 1310 can include various components, where different combinations of components can implement different RATs.

Figure 14:
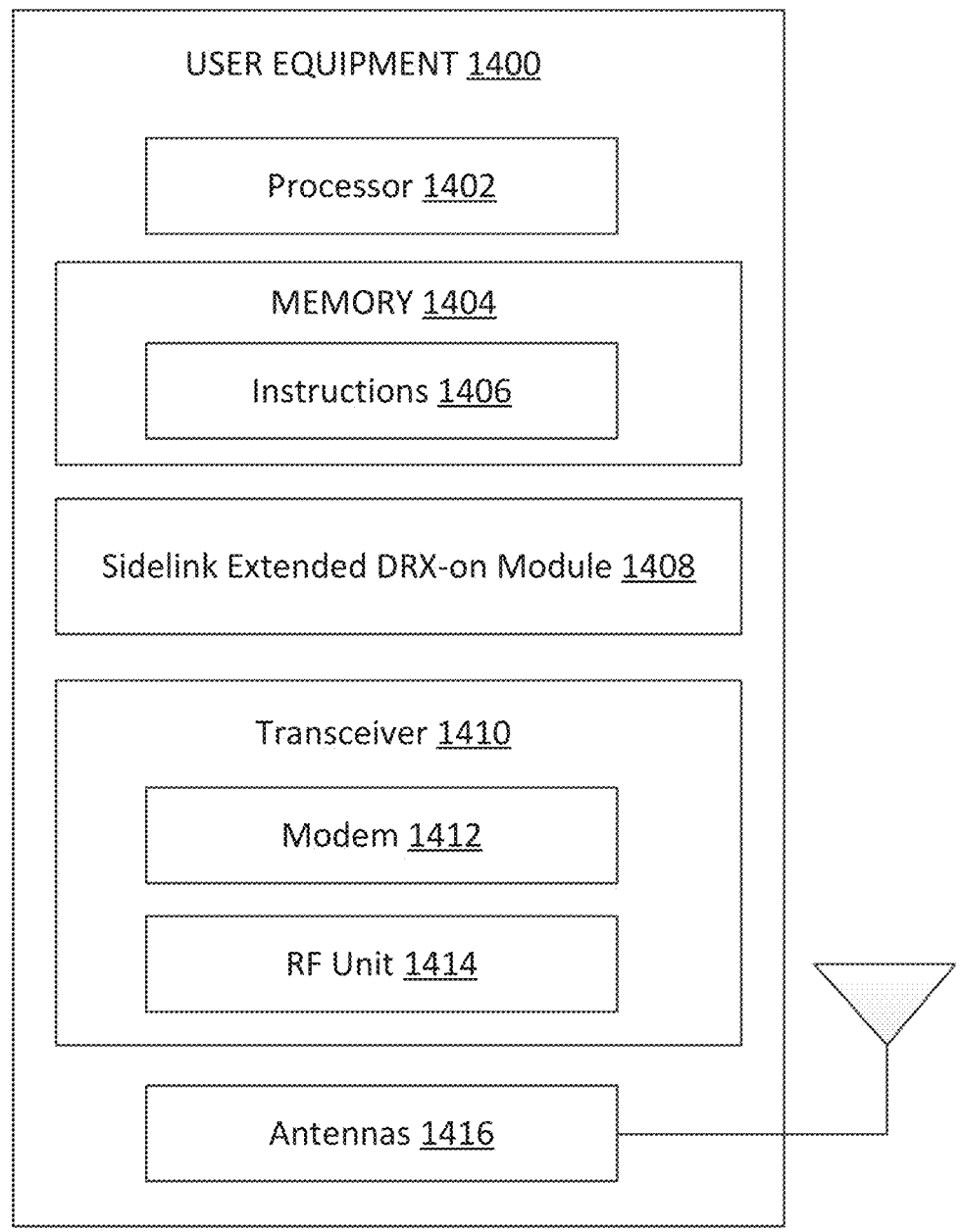
FIG. 14 illustrates a block diagram of a user equipment (UE) according to some aspects of the present disclosure.

FIG. 14 is a block diagram of an exemplary UE 1400 according to some aspects of the present disclosure. The UE 1400 may be a UE 115 as discussed above in FIGS. 1-3, 4A-4B, 5-12, and 15-16. As shown, the UE 1400 may include a processor 1402, a memory 1404, a sidelink extended DRX-on module 1408, a transceiver 1410 including a modem subsystem 1412 and a radio frequency (RF) unit 1414, and one or more antennas 1416. These elements may be coupled with one another. The term "coupled" may refer to directly or indirectly coupled or connected to one or more intervening elements. For instance, these elements may be in direct or indirect communication with each other, for example via one or more buses.

The processor 1402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1404 includes a non-transitory computer-readable medium. The memory 1404 may store, or have recorded thereon, instructions 1406. The instructions 1406 may include instructions that, when executed by the processor 1402, cause the processor 1402 to perform the operations described herein with reference to a UE 115 or an anchor in connection with aspects of the present disclosure, for example, aspects of FIGS. 1-3, 4A-4B, 5-12, and 15-16. Instructions 1406 may also be referred to as code, which may be interpreted broadly to include any type of computer-readable statement(s) as discussed above with respect to FIG. 13.

The sidelink extended DRX-on module 1408 may be implemented via hardware, software, or combinations thereof. For example, the sidelink extended DRX-on module 1408 may be implemented as a processor, circuit, and/or instructions 1406 stored in the memory 1404 and executed by the processor 1402. In some aspects, the sidelink extended DRX-on module 1408 can be integrated within the modem subsystem 1412. For example, the sidelink extended DRX-on module 1408 can be implemented by a combination of software components (e.g., executed by a DSP or a general processor) and hardware components (e.g., logic gates and circuitry) within the modem subsystem 1412. The sidelink extended DRX-on module 1408 may communicate with one or more components of UE 1400 to implement various aspects of the present disclosure, for example, aspects of FIGS. 1-3, 4A-4B, 5-12, and 15-16.

In some aspects, the UE 1400 may operate as a sidelink transmitting UE, for example, corresponding to the UE 402*a* discussed above in FIGS. 4A-4B and 5-12. When the UE 1400 operates as a sidelink transmitting UE, the sidelink extended DRX-on module 1408 is configured to determine a transmission pattern for a first sidelink based on an extended DRX on-duration associated with a second sidelink different from the first sidelink. The first sidelink may be between the UE 1400 and a second UE (e.g., a UE 115, 302, 402, or 1400). The second sidelink may be between the second UE and a third UE (e.g., a UE 115, 302, 402, or 1400). In some aspects, the extended DRX on-duration is extended from an on-duration of a DRX cycle associated with the second sidelink. The sidelink extended DRX-on module 1408 is further configured to schedule a transmission for the second UE over the first sidelink during the extended DRX on-duration and transmit a communication signal to the second UE over the first sidelink during the extended DRX on-duration. The communication signal may be scheduled in a period outside of an-duration of a DRX cycle associated with the first sidelink. In some aspects, the sidelink extended DRX-on module 1408 is configured to monitor for SCI and/or NACK over the second sidelink and determine the extended DRX on-duration based on the monitoring and information related to DRX operations performed at the second UE. For instance, the sidelink extended DRX-on module 1408 is configured to receive or obtain information related to DRX operations at the second UE. The DRX operation information may include mechanisms that the second UE utilizes for starting and/or configuring a DRX-inactivity timer upon receiving SCI, and/or starting and/or configuring a DRX-HARQ-RTT timer and/or a DRX-retransmission timer transmitting a NACK as discussed above with reference to FIGS. 6-12.

In some aspects, the UE 1400 may operate as a sidelink receiving UE, for example, corresponding to the UE 402*c* discussed above in FIGS. 4A-4B and 5-12. When the UE 1400 operates as a sidelink receiving UE, the sidelink extended DRX-on module 1408 is configured to receive, from a second UE over a first sidelink, a first communication signal and receive, from a third UE over a second sidelink during an extended DRX on-duration associated with the first sidelink, a second communication signal. The second sidelink is different from the first sidelink, and the extended DRX on-duration is based on the first communication signal. In some aspects, the extended DRX on-duration is extended from an on-duration of a DRX cycle associated with the first sidelink based on the first communication signal, and the second communication signal is received during a period outside of an on-duration of a DRX cycle associated with the second sidelink. In some aspects, the first communication signal may include SCI and data, and the sidelink extended DRX-on module 1408 is further configured to start or restart a DRX-inactivity timer in response to receiving the SCI as discussed above with reference to FIGS. 6, 7, and/or 8. In some aspects, the sidelink extended DRX-on module 1408 is configured to transmit, to the third UE over the second sidelink, information related to DRX operations at the UE 1400. The DRX operation information may include mechanisms that the UE 1400 utilizes for starting and/or configuring a DRX-inactivity timer upon receiving SCI, and/or starting and/or configuring a DRX-HARQ-RTT timer and/or a DRX-retransmission timer transmitting a NACK as discussed above with reference to FIGS. 6-12.

As shown, the transceiver 1410 may include the modem subsystem 1412 and the RF unit 1414. The transceiver 1410 can be configured to communicate bi-directionally with other devices, such as the BSs 105 and 1300. The modem subsystem 1412 may be configured to modulate and/or encode the data from the memory 1404 and/or the sidelink extended DRX-on module 1408 according to a modulation and coding scheme (MCS), e.g., a low-density parity check (LDPC) coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., SCI, SCI-1, SCI-2, PSSCH data, HARQ ACK/NACK, and/or information related to DRX cycles, extend DRX on-durations, DRX-inactivity timer, DRX-HARQ-RTT timer, and/or DRX-retransmission timer, configuration and time value, etc.) or of transmissions originating from another source such as a UE 115, a BS 105, or an anchor. The RF unit 1414 may be further configured to perform analog beamforming in conjunction with the digital beamforming. Although shown as integrated together in transceiver 1410, the modem subsystem 1412 and the RF unit 1414 may be separate devices that are coupled together at the UE 1400 to enable the UE 1400 to communicate with other devices.

The RF unit 1414 may provide the modulated and/or processed data, e.g. data packets (or, more generally, data messages that may contain one or more data packets and other information), to the antennas 1416 for transmission to one or more other devices. The antennas 1416 may further receive data messages transmitted from other devices. The antennas 1416 may provide the received data messages for processing and/or demodulation at the transceiver 1410. The transceiver 1410 may provide the demodulated and decoded data (e.g., SCI, SCI-1, SCI-2, PSSCH data, HARQ ACK/NACK, and/or information related to DRX cycles, extend DRX on-durations, DRX-inactivity timer, DRX-HARQ-RTT timer, and/or DRX-retransmission timer, configuration and time value, etc.) to the sidelink extended DRX-on module 1408 for processing. The antennas 1416 may include multiple antennas of similar or different designs in order to sustain multiple transmission links.

In an aspect, the UE 1400 can include multiple transceivers 1410 implementing different RATs (e.g., NR and LTE). In an aspect, the UE 1400 can include a single transceiver 1410 implementing multiple RATs (e.g., NR and LTE). In an aspect, the transceiver 1410 can include various components, where different combinations of components can implement different RATs.

Further, in some aspects, the processor 1402 is coupled to the transceiver 1410, and the processor 1402 is configured to determine a transmission pattern for a first sidelink based on an extended DRX on-duration associated with a second sidelink different from the first sidelink, where the first sidelink is between the first UE and a second UE, and the second sidelink is between the second UE and a third UE. The processor 1402 is further configured to transmit, to the second UE via the transceiver 1410 over the first sidelink during the extended DRX on-duration based on the transmission pattern, a communication signal.

Further, in some aspects, the processor 1402 is coupled to the transceiver 1410, and the processor 1402 is configured to receive, from a second UE via the transceiver 1410 over a first sidelink, a first communication signal. The processor 1402 is further configured to receive, from a third UE over a second sidelink during an extended DRX on-duration associated with the first sidelink, a second communication signal, where the second sidelink is different from the first sidelink, and the extended DRX on-duration is based on the first communication signal.

Figure 15:
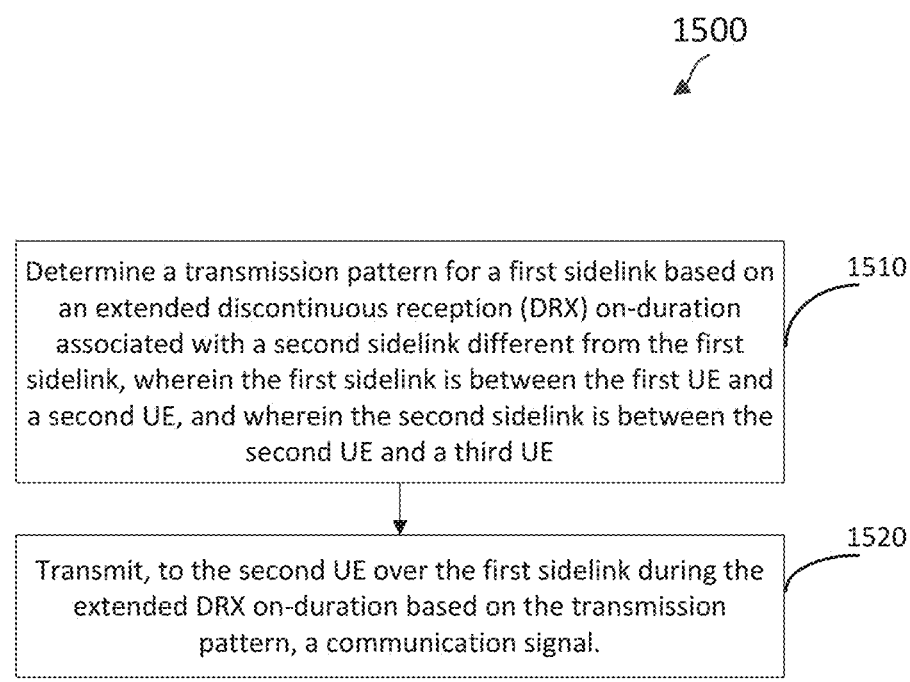
FIG. 15 is a flow diagram of a wireless communication method according to some aspects of the present disclosure.

FIG. 15 is a flow diagram illustrating a wireless communication method 1500 according to some aspects of the present disclosure. Aspects of the method 1500 can be executed by a computing device (e.g., a processor, processing circuit, and/or other suitable component) of a wireless communication device or other suitable means for performing the blocks. In some aspects, a wireless communication device, such as a UE 115, 402, or 1400, may utilize one or more components, such as the processor 1402, the memory 1404, the sidelink extended DRX-on module 1408, the transceiver 1410, the modem 1412, the RF unit 1414, and the one or more antennas 1416, to execute the blocks of method 1500. The method 1500 may employ similar mechanisms as described in FIGS. 1-3, 4A-4B, and 5-12. As illustrated, the method 1500 includes a number of enumerated blocks, but aspects of the method 1500 may include additional blocks before, after, and in between the enumerated blocks. In some aspects, one or more of the enumerated blocks may be omitted or performed in a different order.

At block 1510, a first UE determines a transmission pattern for a first sidelink based on an extended discontinuous reception (DRX) on-duration associated with a second sidelink different from the first sidelink. The first sidelink is between the first UE and a second UE. For instance, the first UE is a sidelink transmitting UE and the second UE is a sidelink receiving UE over the first sidelink. The second sidelink is between the second UE and a third UE. For instance, the third UE is a sidelink transmitting UE and the second UE is a sidelink receiving UE over the second sidelink. In some aspects, the extended DRX on-duration is extended from an on-duration of a DRX cycle associated with the second sidelink. The first UE may determine the transmission pattern for the first sidelink by taking the extended DRX on-duration of the second sidelink into consideration. For instance, the first UE may initially determine the transmission pattern based on the first DRX cycle, where each transmission on-duration of the transmission pattern may be within a DRX on-duration of the first DRX cycle. Subsequently, the first UE may dynamically adjust the transmission pattern based on the extended DRX on-duration. For example, the first UE may add a transmission on-duration corresponding to the extended DRX on-duration (during which the second UE may be in an active state monitoring for transmission) into the transmission pattern. In some instances, the first UE may schedule a transmission for the second UE over the first sidelink within a duration of the extended DRX on-duration. In some aspects, means for performing the functionality of block 1510 can, but not necessarily, include, for example, sidelink extended DRX-on module 1408, transceiver 1410, antennas 1416, processor 1402, and/or memory 1404 with reference to FIG. 14.

At block 1520, the first UE transmits a communication signal to the second UE over the first sidelink during the extended DRX on-duration based on the transmission pattern. The communication signal may include SCI and data, for example, as discussed above with reference to FIG. 3. In some aspects, as part of transmitting the communication signal, the first UE transmits the communication signal during a period outside of an on-duration of a DRX cycle associated with the first sidelink. In some aspects, means for performing the functionality of block 1520 can, but not necessarily, include, for example, sidelink extended DRX-on module 1408, transceiver 1410, antennas 1416, processor 1402, and/or memory 1404 with reference to FIG. 14.

In some aspects, the first UE may further monitor for SCI associated with the second sidelink. The monitoring for the SCI may include receiving a signal from the channel, measuring the received signal energy, and performing blind SCI decoding on the received signal when the signal energy is above a certain threshold. Further, in response to detecting the SCI from the monitoring, the first UE determines the extended DRX on-duration for the second sidelink. In some aspects, the first UE may determine the extended DRX on-duration for the second sidelink when the SCI indicates a destination ID matching an ID that identifies the second UE.

In some aspects, the SCI indicates one or more sidelink reservations, and the first UE may determine the extended DRX on-duration based on a time resource reserved by a next sidelink reservation of the one or more sidelink reservations. To that end, the first UE may have information related to a DRX-inactivity timer configuration at the second UE. For instance, the first UE may receive, from the second UE over the first sidelink, the DRX-inactivity timer configuration indicating that the second UE may start or restart a DRX-inactivity timer upon detecting a sidelink transmission (e.g., SCI) destined to the second UE and configure the DRX-inactivity timer with a duration to cover up to a next reserved sidelink resource (in time) indicated by the SCI as discussed above with reference to FIG. 6. Thus, the first UE may determine the extended DRX on-duration based on the DRX-inactivity timer configuration.

In some aspects, the SCI indicates one or more sidelink reservations, and the first UE may determine the extended DRX on-duration based on at least one of a time resource reserved by a last sidelink reservation of the one or more sidelink reservations or a time offset from the time resource. To that end, the first UE may have information related to a DRX-inactivity timer configuration at the second UE. For instance, the first UE may receive, from the second UE over the first sidelink, the DRX-inactivity timer configuration indicating that the second UE may start a DRX-inactivity timer upon detecting a sidelink transmission (e.g., SCI) destined to the second UE and configure the DRX-inactivity timer with a duration to cover the last resource reserved by the SCI and an additional X number of slots (e.g., a time offset) after the last reserved resource as discussed above with reference to FIG. 7. Thus, the first UE may determine the extended DRX on-duration based on the DRX-inactivity timer configuration.

In some aspects, the SCI indicates one or more sidelink reservations, and the first UE may determine the extended DRX on-duration based on at least one of a physical sidelink feedback channel (PSFCH) resource associated with a last sidelink reservation of the one or more sidelink reservations or a time offset from the PSFCH resource. To that end, the first UE may have information related to a DRX-inactivity timer configuration at the second UE. For instance, the first UE may receive, from the second UE over the first sidelink, the DRX-inactivity timer configuration indicating that the second UE may start a DRX-inactivity timer upon detecting a sidelink transmission (e.g., SCI) destined to the second UE and configure the DRX-inactivity timer with a duration to cover a PSFCH resource associated with the last resource reserved by the SCI and an additional Y number of slots (e.g., a time offset) after the PSFCH resource as discussed above with reference to FIG. 8. Thus, the first UE may determine the extended DRX on-duration based on the DRX-inactivity timer configuration.

In some aspects, the first UE may further monitor, in a PSFCH resource pool associated with the second sidelink, for an ACK/NACK indication for data associated with the SCI, and determines the extended DRX on-duration further based on the monitoring for the ACK/NACK indication. The monitoring for the ACK/NACK may include receiving a signal from the PSFCH resource and performing decoding on the received signal to determine whether an ACK or an ACK is carried in the received signal. An ACK indication may be represented by a certain bit value or a certain sequence, and an NACK indication may be represented by a different bit value or a different sequence. In some aspects, in response to detecting a NACK indication from the monitoring for the ACK/NACK indication, the first UE may determine the extended DRX on-duration based on at least one of a DRX-HARQ-RTT timer value or a DRX-retransmission timer value as discussed above with reference to FIGS. 5 and 9. In some aspects, in response to failing to receive the ACK/NACK indication for the data from the monitoring for the ACK/NACK indication, the first UE may adjust the extended DRX on-duration. In some instances, the first UE may fail to detect any ACK/NACK indication if the second UE detected a mismatch between a full destination ID in the data and a MAC ID of the second UE. In such instances, the first UE may have information that the second UE will terminate the extended DRX-on duration early. Thus, the first UE may also end the extended DRX-on duration early (e.g., K slots after the PSFCH resource) as discussed above with reference to FIG. 11. In some aspects, the first UE may receive, from the second UE over the first sidelink, a configuration for the PSFCH resource pool associated with the second sidelink.

In some aspects, as part of determining the transmission pattern at block 1510, the first UE may determine the transmission pattern further based on an extended DRX on-duration threshold. For instance, the first UE may have information that the second UE may limit the duration of an extended DRX on-duration based on the extended DRX on-duration threshold as discussed above with reference to FIG. 12.

In some aspects, the first UE may further receive, from the second UE over the first sidelink, at least one of timing information, a DRX pattern, or a transmitter ID associated with the extended DRX on-duration. In some instances, the timing information may include a start time, a duration, and/or an end time of the extended DRX on-duration at the second UE. In some aspects, the first UE may receive the at least one of the timing information or the transmitted ID via broadcast signaling, for example, either as part of SCI-2 or as part of data carried in a PSSCH. In other aspects, the first UE may receive the at least one of the timing information or the transmitter ID via unicast signaling, for example, received along with a HARQ ACK/NACK in a PSFCH resource.

Figure 16:
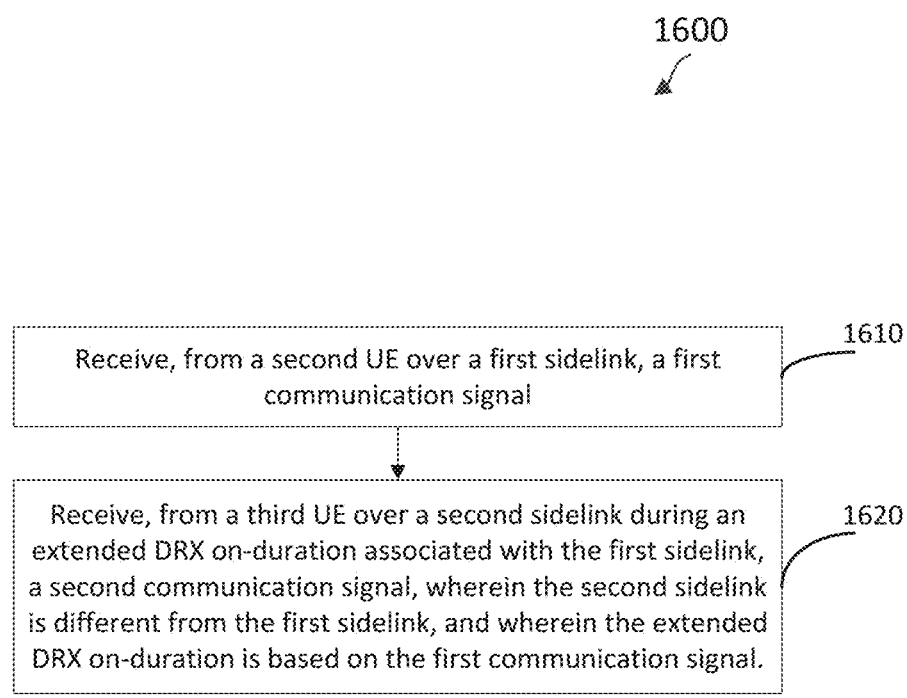
FIG. 16 is a flow diagram of a wireless communication method according to some aspects of the present disclosure.

FIG. 16 is a flow diagram illustrating a wireless communication method 1600 according to some aspects of the present disclosure. Aspects of the method 1600 can be executed by a computing device (e.g., a processor, processing circuit, and/or other suitable component) of a wireless communication device or other suitable means for performing the blocks. In some aspects, a wireless communication device, such as a UE 115, 402, or 1400, may utilize one or more components, such as the processor 1402, the memory 1404, the sidelink extended DRX-on module 1408, the transceiver 1410, the modem 1412, the RF unit 1414, and the one or more antennas 1416, to execute the blocks of method 1600. The method 1600 may employ similar mechanisms as described in FIGS. 1-3, 4A-4B, and 5-12. As illustrated, the method 1600 includes a number of enumerated blocks, but aspects of the method 1600 may include additional blocks before, after, and in between the enumerated blocks. In some aspects, one or more of the enumerated blocks may be omitted or performed in a different order.

At block 1610, a first UE receives, from a second UE over a first sidelink, a first communication signal. The first communication signal may include SCI and data, for example, as discussed above with reference to FIG. 3. In some aspects, means for performing the functionality of block 1610 can, but not necessarily, include, for example, sidelink extended DRX-on module 1408, transceiver 1410, antennas 1416, processor 1402, and/or memory 1404 with reference to FIG. 14.

At block 1620, the first UE receives, from a third UE over a second sidelink during an extended DRX on-duration associated with the first sidelink, a second communication signal. The second sidelink is different from the first sidelink, and the extended DRX on-duration is based on the first communication signal. In some aspects, the extended DRX on-duration is extended from an on-duration of a DRX cycle associated with the first sidelink based on the first communication signal. For instance, the first UE may communicate with the second UE over the first sidelink according to a DRX cycle. The first UE may perform blind SCI decoding on the first communication signal. After decoding the SCI successfully, the first UE may determine whether the SCI is intended for the first UE based on a destination ID indicated by the SCI. If the destination ID matches an ID of the first UE, the SCI is destined to the first UE. In response to determining that the SCI is destined to the first UE, the first UE may extend the on-duration of the DRX cycle by the extended DRX on-duration. In some aspects, the first UE may receive the second communication signal during a period outside of an on-duration of a DRX cycle associated with the second sidelink. In some aspects, means for performing the functionality of block 1620 can, but not necessarily, include, for example, sidelink extended DRX-on module 1408, transceiver 1410, antennas 1416, processor 1402, and/or memory 1404 with reference to FIG. 14.

In some aspects, the SCI may indicate one or more sidelink reservations, and the extended DRX on-duration is based on at least one of a time resource reserved by a next sidelink reservation of the one or more sidelink reservations or a predetermined DRX-inactivity timer value. For instance, the first UE may start or restart a DRX-inactivity timer upon detecting the SCI and may configure the DRX-inactivity timer with a duration to cover up to a next reserved sidelink resource (in time) indicated by the SCI as discussed above with reference to FIG. 6. In some aspects, the SCI may indicate one or more sidelink reservations, and the extended DRX on-duration is based on at least one of a time resource reserved by a last sidelink reservation of the one or more sidelink reservations or a time offset from the time resource. For instance, the first UE may start a DRX-inactivity timer upon detecting the SCI and configure the DRX-inactivity timer with a duration to cover the last resource reserved by the SCI and an additional X number of slots (e.g., a time offset) after the last reserved resource as discussed above with reference to FIG. 7. In some aspects, the SCI may indicate one or more sidelink reservations, and the extended DRX on-duration is based on at least one of a time location of a PSFCH resource associated with a last sidelink reservation of the one or more sidelink reservations or a time offset from the PSFCH resource. For instance, the first UE may start a DRX-inactivity timer upon detecting the SCI and configure the DRX-inactivity timer with a duration to cover a PSFCH resource associated with the last resource reserved by the SCI and an additional Y number of slots (e.g., a time offset) after the PSFCH resource as discussed above with reference to FIG. 8.

In some aspects, the first UE may further transmit, to the third UE over the second sidelink, a DRX-inactivity timer configuration associated with the first sidelink. The DRX-inactivity timer configuration may indicate whether the first UE may configure the DRX-activity timer duration to cover a next sidelink resource reserved by SCI (in the first communication signal), to cover X slots after a last sidelink resource reserved by the SCI, or to cover Y slots after a PSFCH resource associated with a last sidelink resource reserved by the SCI, for example, as discussed above with reference to FIG. 6, 7, or 8, respectively.

In some aspects, the first UE may further transmit, to the third UE over the second sidelink, a configuration for a PSFCH resource pool associated with the first sidelink. For instance, the PSFCH resource pool may include time-frequency resources where the first UE may transmit a HARQ ACK/NACK for data received over the first sidelink. The indication of the PSFCH resource pool to the third UE allows the third UE to perform ACK/NACK monitoring to determine the extended DRX on-duration at the first UE. In that way, the third UE can schedule the second communication signal during the extended DRX on-duration, for example, as discussed above with reference to FIGS. 9 and 10.

In some aspects, the first communication signal may include SCI and data, where the SCI indicates a destination ID truncated from a full destination ID and the data indicates the full destination ID. The full destination ID may be a MAC ID. Since the truncated destination ID in the SCI includes a portion of the full destination ID, there is a probability that the truncated destination ID the SCI matches a portion of the first UE's MAC ID, but the full destination ID in the data does not match the first UE's MAC ID completely. In some instances, the first UE may start a DRX-inactivity timer in response to receiving the SCI (e.g., based on the truncated destination ID in the SCI matching a portion of the first UE's MAC ID. If the first UE determines that the full destination ID in the data fails to match the first UE's MAC ID, the first UE may refrain from transmitting an ACK/NACK feedback for the data. Further, the first UE may reset the DRX-inactivity timer based on the full destination ID failing to match the first UE's MAC ID, for example, as discussed above with reference to FIG. 11.

In some aspects, the first UE may further determine the extended DRX on-duration for the first sidelink based on an extended DRX on-duration threshold. In some aspects, the first UE may refrain from starting a DRX-inactivity timer for the second sidelink based on receiving the second communication signal during an extended DRX on-duration associated with the first sidelink.

In some aspects, the first UE may further transmit, to the third UE over the second sidelink, at least one of timing information, a transmitter identifier (ID), or a DRX pattern associated with the extended DRX on-duration of the first sidelink. In some instances, the timing information may include a start time, a duration, and/or an end time of the extended DRX on-duration at the first UE. In some aspects, the first UE may transmit the at least one of the timing information or the transmitted ID via broadcast signaling, for example, either as part of SCI-2 or as part of data carried in a PSSCH. In other aspects, the first UE may transmit the at least one of the timing information or the transmitter ID via unicast signaling, for example, transmitted along with a HARQ ACK/NACK in a PSFCH resource.

Further aspects of the present disclosure include the following:
 1. A method of wireless communication performed by a first user equipment (UE), the method comprising:
     determining a transmission pattern for a first sidelink based on an extended discontinuous reception (DRX) on-duration associated with a second sidelink different from the first sidelink, wherein the first sidelink is between the first UE and a second UE, and wherein the second sidelink is between the second UE and a third UE; and transmitting, to the second UE over the first sidelink during the extended DRX on-duration based on the transmission pattern, a communication signal.

2. The method of aspect 1, wherein:
the extended DRX on-duration is extended from an on-duration of a DRX cycle associated with the second sidelink; and
the transmitting the communication signal comprises:
transmitting, during a period outside of an on-duration of a DRX cycle associated with the first sidelink, the communication signal.

3. The method of any of aspects 1-2, further comprising:
monitoring for sidelink control information (SCI) associated with the second sidelink; and
determining, in response to detecting the SCI from the monitoring, the extended DRX on-duration for the second sidelink.

4. The method any of aspects 1-3, wherein:
the SCI indicates one or more sidelink reservations; and
the determining the extended DRX on-duration for the second sidelink comprises:
determining the extended DRX on-duration based on a time resource reserved by a next sidelink reservation of the one or more sidelink reservations.

5. The method any of aspects 1-3, wherein:
the SCI indicates one or more sidelink reservations; and
the determining the extended DRX on-duration for the second sidelink comprises:
determining the extended DRX on-duration based on at least one of a time resource reserved by a last sidelink reservation of the one or more sidelink reservations or a time offset from the time resource.

6. The method of any of aspects 1-3, wherein:
the SCI indicates one or more sidelink reservations; and
the determining the extended DRX on-duration for the second sidelink comprises:
determining the extended DRX on-duration based on at least one of a physical sidelink feedback channel (PSFCH) resource associated with a last sidelink reservation of the one or more sidelink reservations or a time offset from the PSFCH resource.

7. The method of any of aspects 1-6, further comprising:
receiving, from the second UE over the first sidelink, a DRX-inactivity timer configuration associated with the second sidelink,
wherein the determining the extended DRX on-duration is further based on the DRX-inactivity timer configuration.

8. The method of any of aspects 1-7, further comprising:
monitoring, in a physical sidelink feedback channel (PSFCH) resource pool associated with the second sidelink, for an acknowledgement/negative-acknowledgement (ACK/NACK) indication for data associated with the SCI,
wherein the determining the extended DRX on-duration is further based on the monitoring for the ACK/NACK indication.

9. The method of aspect 8, wherein the determining the extended DRX on-duration further comprises:
determining, in response to detecting a NACK indication from the monitoring for the ACK/NACK indication, the extended DRX on-duration based on at least one of a DRX-hybrid automatic repeat request round-trip-time (DRX-HARQ RTT) timer value or a DRX-retransmission timer value.

10. The method of aspect 8, wherein the determining the extended DRX on-duration further comprises:
adjusting, in response to failing to receive the ACK/NACK indication for the data from the monitoring for the ACK/NACK indication, the extended DRX on-duration.

11. The method of any of aspects 1-10, further comprising:
receiving, from the second UE over the first sidelink, a configuration for the PSFCH resource pool associated with the second sidelink.

12. The method of any of aspects 1-11, wherein the determining the transmission pattern is further based on an extended DRX on-duration threshold.

13. The method of any of aspects 1-2, further comprising:
receiving, from the second UE over the first sidelink, at least one of timing information, a transmitter identifier (ID), or a DRX pattern associated with the extended DRX on-duration.

14. A method of wireless communication performed by a first user equipment (UE), the method comprising:
receiving, from a second UE via a first sidelink, a first communication signal; and
receiving, from a third UE via a second sidelink during an extended DRX on-duration associated with the first sidelink, a second communication signal, wherein the second sidelink is different from the first sidelink, and wherein the extended DRX on-duration is based on the first communication signal.

15. The method of aspect 14, wherein:
the extended DRX on-duration is extended from an on-duration of a DRX cycle associated with the first sidelink based on the first communication signal; and
the receiving the second communication signal comprises:
receiving, during a period outside of an on-duration of a DRX cycle associated with the second sidelink, the second communication signal.

16. The method of aspect 14, wherein the first communication signal comprises sidelink control information (SCI), and wherein the extended DRX on-duration is based on the SCI.

17. The method of any of aspects 14-16, wherein the SCI indicates one or more sidelink reservations, and wherein the extended DRX on-duration is based on at least one of a time resource reserved by a next sidelink reservation of the one or more sidelink reservations or a predetermined DRX-inactivity timer value.

18. The method of any of aspects 14-16, wherein the SCI indicates one or more sidelink reservations, and wherein the extended DRX on-duration is based on at least one of a time resource reserved by a last sidelink reservation of the one or more sidelink reservations or a time offset from the time resource.

19. The method of any of aspects 14-16, wherein the SCI indicates one or more sidelink reservations, and wherein the extended DRX on-duration is based on at least one of a time location of a physical sidelink feedback channel (PSFCH) resource associated with a last sidelink reservation of the one or more sidelink reservations or a time offset from the PSFCH resource.

20. The method any of aspects 14-19, further comprising:
    transmitting, to the third UE over the second sidelink, a DRX-inactivity timer configuration associated with the first sidelink.

21. The method of any of aspects 14-20, further comprising:
    transmitting, to the third UE over the second sidelink, a configuration for a PSFCH resource pool associated with the first sidelink.

22. The method of any of aspects 14-21, wherein:
    the first communication signal includes sidelink control information (SCI) and data, the SCI indicating a destination identifier (ID) truncated from a full destination ID and the data indicating the full destination ID; and
    the method further comprises:
        starting, in response to receiving the SCI, a DRX-inactivity timer;
        refraining, based on the full destination ID failing to match a media access control (MAC) ID of the first UE, from transmitting an acknowledgement/negative-acknowledgement (ACK/NACK) indication for the first communication signal; and
        resetting, based on the full destination ID failing to match the MAC ID of the first UE, the DRX-inactivity timer.

23. The method of aspect 14, further comprising:
    determining the extended DRX on-duration for the first sidelink based on an extended DRX on-duration threshold.

24. The method of any of aspects 14-23, further comprising:
    refraining from starting a DRX-inactivity timer based on receiving the second communication signal during the extended DRX on-duration associated with the first sidelink.

25. The method any of aspects 14-24, further comprising:
    transmitting, to the third UE over the second sidelink, at least one of timing information, a transmitter identifier (ID), or a DRX pattern associated with the extended DRX on-duration of the first sidelink.

26. An apparatus comprising a processor coupled to a transceiver, wherein the processor and transceiver are configured to perform the method of any one of aspects 1-13.

27. An apparatus comprising a processor coupled to a transceiver, wherein the processor and transceiver are configured to perform the method of any one of aspects 14-25.

28. An apparatus comprising means for performing the method of any one of aspects 1-13.

29. An apparatus comprising means for performing the method of any one of aspects 14-25.

30. A non-transitory computer readable medium including program code, which when executed by one or more processors, causes a wireless communication device to perform the method of any one of aspects 1-13.

31. A non-transitory computer readable medium including program code, which when executed by one or more processors, causes a wireless communication device to perform the method of any one of aspects 14-25.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
    determining an extended discontinuous reception (DRX) on-duration based on at least one of a DRX-hybrid automatic repeat request round-trip-time (DRX-HARQ RTT) timer value or a DRX-retransmission timer value;
    determining a transmission pattern for a first sidelink based on the extended DRX on-duration associated with a second sidelink different from the first sidelink, wherein the first sidelink is between the first UE and a second UE, and wherein the second sidelink is between the second UE and a third UE;
    transmitting, to the second UE over the first sidelink during the extended DRX on-duration based on the transmission pattern, a communication signal; and
    monitoring, in a physical sidelink feedback channel (PSFCH) resource pool associated with the second sidelink, for an acknowledgement/negative-acknowledgement (ACK/NACK) indication for data associated with the SCI.

2. The method of claim 1, wherein:
the extended DRX on-duration is extended from an on-duration of a DRX cycle associated with the second sidelink; and
the transmitting the communication signal comprises:
transmitting, during a period outside of an on-duration of a DRX cycle associated with the first sidelink, the communication signal.

3. The method of claim 1, further comprising:
monitoring for sidelink control information (SCI) associated with the second sidelink; and
determining, in response to detecting the SCI from the monitoring, the extended DRX on-duration for the second sidelink.

4. The method of claim 3, wherein:
the SCI indicates one or more sidelink reservations; and
the determining the extended DRX on-duration for the second sidelink comprises:
determining the extended DRX on-duration based on a time resource reserved by a next sidelink reservation of the one or more sidelink reservations.

5. The method of claim 3, wherein:
the SCI indicates one or more sidelink reservations; and
the determining the extended DRX on-duration for the second sidelink comprises:
determining the extended DRX on-duration based on at least one of a time resource reserved by a last sidelink reservation of the one or more sidelink reservations or a time offset from the time resource.

6. The method of claim 3, wherein:
the SCI indicates one or more sidelink reservations; and
the determining the extended DRX on-duration for the second sidelink comprises:
determining the extended DRX on-duration based on at least one of a physical sidelink feedback channel (PSFCH) resource associated with a last sidelink reservation of the one or more sidelink reservations or a time offset from the PSFCH resource.

7. The method of claim 3, further comprising:
receiving, from the second UE over the first sidelink, a DRX-inactivity timer configuration associated with the second sidelink,
wherein the determining the extended DRX on-duration is further based on the DRX-inactivity timer configuration.

8. The method of claim 3,
wherein the determining the extended DRX on-duration is further based on the monitoring for the ACK/NACK indication.

9. The method of claim 8, wherein the determining the extended DRX on-duration:
is in response to detecting a NACK indication from the monitoring for the ACK/NACK indication.

10. The method of claim 8, wherein the determining the extended DRX on-duration further comprises:
adjusting, in response to failing to receive the ACK/NACK indication for the data from the monitoring for the ACK/NACK indication, the extended DRX on-duration.

11. The method of claim 8, further comprising:
receiving, from the second UE over the first sidelink, a configuration for the PSFCH resource pool associated with the second sidelink.

12. The method of claim 1, wherein the determining the transmission pattern is further based on an extended DRX on-duration threshold.

13. The method of claim 1, further comprising:
receiving, from the second UE over the first sidelink, at least one of timing information, a transmitter identifier (ID), or a DRX pattern associated with the extended DRX on-duration.

14. A method of wireless communication performed by a first user equipment (UE), the method comprising:
receiving, from a second UE over a first sidelink, a first communication signal; and
receiving, from a third UE over a second sidelink during an extended DRX on-duration associated with the first sidelink, a second communication signal, wherein the second sidelink is different from the first sidelink, and wherein the extended DRX on-duration is based on the first communication signal,
wherein the first communication signal includes sidelink control information (SCI) and data, the SCI indicating a destination identifier (ID) truncated from a full destination ID and the data indicating the full destination ID.

15. The method of claim 14, wherein:
the extended DRX on-duration is extended from an on-duration of a DRX cycle associated with the first sidelink based on the first communication signal; and
the receiving the second communication signal comprises:
receiving, during a period outside of an on-duration of a DRX cycle associated with the second sidelink, the second communication signal.

16. The method of claim 14, wherein the first communication signal comprises sidelink control information (SCI), and wherein the extended DRX on-duration is based on the SCI.

17. The method of claim 16, wherein the SCI indicates one or more sidelink reservations, and wherein the extended DRX on-duration is based on at least one of a time resource reserved by a next sidelink reservation of the one or more sidelink reservations or a predetermined DRX-inactivity timer value.

18. The method of claim 16, wherein the SCI indicates one or more sidelink reservations, and wherein the extended DRX on-duration is based on at least one of a time resource reserved by a last sidelink reservation of the one or more sidelink reservations or a time offset from the time resource.

19. The method of claim 16, wherein the SCI indicates one or more sidelink reservations, and wherein the extended DRX on-duration is based on at least one of a time location of a physical sidelink feedback channel (PSFCH) resource associated with a last sidelink reservation of the one or more sidelink reservations or a time offset from the PSFCH resource.

20. The method of claim 14, further comprising:
transmitting, to the third UE over the second sidelink, a DRX-inactivity timer configuration associated with the first sidelink.

21. The method of claim 14, further comprising:
transmitting, to the third UE over the second sidelink, a configuration for a PSFCH resource pool associated with the first sidelink.

22. The method of claim 14, further comprising:
starting, in response to receiving the SCI, a DRX-inactivity timer;
refraining, based on the full destination ID failing to match a media access control (MAC) ID of the first UE, from transmitting an acknowledgement/negative-acknowledgement (ACK/NACK) indication for the first communication signal; and
resetting, based on the full destination ID failing to match the MAC ID of the first UE, the DRX-inactivity timer.

23. The method of claim 14, further comprising:
determining the extended DRX on-duration for the first sidelink based on an extended DRX on-duration threshold.

24. The method of claim 14, further comprising:
refraining from starting a DRX-inactivity timer based on receiving the second communication signal during the extended DRX on-duration associated with the first sidelink.

25. The method of claim 14, further comprising:
transmitting, to the third UE over the second sidelink, at least one of timing information, a transmitter identifier (ID), or a DRX pattern associated with the extended DRX on-duration of the first sidelink.

26. A first user equipment (UE) comprising:
a memory;
a transceiver; and
at least one processor coupled to the memory and the transceiver, wherein the memory stores instructions that are executable by the at least one processor, individually or in any combination, to cause the first UE to:
determine an extended discontinuous reception (DRX) on-duration based on at least one of a DRX-hybrid automatic repeat request round-trip-time (DRX-HARQ RTT) timer value or a DRX-retransmission timer value
determine a transmission pattern for a first sidelink based on the extended DRX on-duration associated with a second sidelink different from the first sidelink, wherein the first sidelink is between the first UE and a second UE, and wherein the second sidelink is between the second UE and a third UE;
transmit, via the transceiver to the second UE over first sidelink during the extended DRX on-duration based on the transmission pattern, a communication signal; and
monitor, in a physical sidelink feedback channel (PSFCH) resource pool associated with the second sidelink, for an acknowledgement/negative-acknowledgement (ACK/NACK) indication for data associated with the SCI.

27. The first UE of claim 26, wherein:
the extended DRX on-duration is extended from an on-duration of a DRX cycle associated with the second sidelink; and
the at least one processor configured to transmit the communication signal is configured to:
transmit, during a period outside of an on-duration of a DRX cycle associated with the first sidelink, the communication signal.

28. The first UE of claim 26, wherein the at least one processor is further configured to:
monitor for at least one of sidelink control information (SCI) or an acknowledgement/negative-acknowledgement (ACK/NACK) indication associated with the second sidelink; and
determine, in response to detecting the SCI from the monitoring, the extended DRX on-duration for the second sidelink.

29. A first user equipment (UE) comprising:
a memory;
a transceiver; and
at least one processor coupled to the memory and the transceiver, wherein the memory stores instructions that are executable by the at least one processor, individually or in any combination, to cause the first UE to:
receive, via the transceiver from a second UE over first sidelink, a first communication signal; and
receive, via the transceiver from a third UE over a second sidelink during an extended DRX on-duration associated with the first sidelink, a second communication signal, wherein the second sidelink is different from the first sidelink, and wherein the extended DRX on-duration is based on the first communication signal,
wherein the first communication signal includes sidelink control information (SCI) and data, the SCI indicating a destination identifier (ID) truncated from a full destination ID and the data indicating the full destination ID.

30. The first UE of claim 29, wherein:
the extended DRX on-duration is extended from an on-duration of a DRX cycle associated with the first sidelink based on the first communication signal; and
the at least one processor configured to receive the second communication signal is configured to:
receive, during a period outside of an on-duration of a DRX cycle associated with the second sidelink, the second communication signal.

* * * * *